(12) United States Patent
Goyal et al.

(10) Patent No.: US 9,881,123 B1
(45) Date of Patent: Jan. 30, 2018

(54) METHOD AND SYSTEM FOR TIMING ANALYSIS WITH ADAPTIVE TIMING WINDOW OPTIMIZATION FOR DETERMINING SIGNAL INTEGRITY IMPACT

(71) Applicant: CADENCE DESIGN SYSTEMS, INC., San Jose, CA (US)

(72) Inventors: Ratnakar Goyal, New Delihi (IN); Manuj Verma, Ghaziabad (IN); Igor Keller, Pleasanton, CA (US); Arvind Nembili Veeravalli, Karnataka (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/198,635

(22) Filed: Jun. 30, 2016

(51) Int. Cl.
*G06F 9/455* (2006.01)
*G06F 17/50* (2006.01)

(52) U.S. Cl.
CPC ...... *G06F 17/5081* (2013.01); *G06F 2217/82* (2013.01); *G06F 2217/84* (2013.01)

(58) Field of Classification Search
CPC ............ G06F 17/5031; G06F 2217/84; G06F 17/5081; G06F 2217/82; H04B 3/32
See application file for complete search history.

(56) References Cited

U.S. PATENT DOCUMENTS

| | | | | |
|---|---|---|---|---|
| 6,510,540 B1 * | 1/2003 | Krauter | ............... | G06F 17/5036 716/115 |
| 8,086,983 B2 * | 12/2011 | Shrivastava | ........ | G06F 17/5036 716/115 |
| 8,650,513 B2 * | 2/2014 | Salz | ...................... | G06F 17/504 716/101 |
| 8,689,158 B2 * | 4/2014 | Kalafala | ............... | G06F 17/504 716/113 |
| 9,026,965 B2 * | 5/2015 | Mogal | ................. | G06F 17/5031 716/106 |
| 2002/0166101 A1 * | 11/2002 | Casavant | .............. | G06F 17/505 716/114 |
| 2006/0112359 A1 * | 5/2006 | Becer | .................. | G06F 17/5036 716/113 |
| 2007/0277131 A1 * | 11/2007 | Schaeffer | ............ | G06F 17/5031 716/113 |
| 2008/0046848 A1 * | 2/2008 | Tetelbaum | .......... | G06F 17/5031 716/113 |

(Continued)

*Primary Examiner* — Nha Nguyen
(74) *Attorney, Agent, or Firm* — Rosenberg, Klein & Lee

(57) ABSTRACT

A method and system are provided for timing analysis of an electronic circuit design. A timing graph defines a plurality of timing paths through different subsections of the electronic circuit design. A timing window is defined for each of the nodes included in a timing path. At least one preliminary round of a predetermined signal integrity analysis is executed on the circuit design based on the timing windows to identify at least one pair of crosstalk-coupled victim and aggressor nodes. Each victim node's timing window is adaptively adjusted according to a predetermined timing property thereof. At least one primary round of the predetermined signal integrity analysis is executed on the electronic circuit design based in part on this adaptively adjusted timing window for each victim node to generate a delay, which is annotated to the timing graph. A predetermined static timing analysis is executed based on the delay-annotated timing graph.

20 Claims, 14 Drawing Sheets

(56) References Cited

U.S. PATENT DOCUMENTS

| | | | |
|---|---|---|---|
| 2010/0083202 A1* | 4/2010 | Shrivastava | G06F 17/5036 716/113 |
| 2010/0218152 A1* | 8/2010 | Tehrani | G06F 17/5036 716/113 |
| 2016/0292344 A1* | 10/2016 | Griyage | H04B 3/32 |
| 2017/0061067 A1* | 3/2017 | Gregerson | G06F 17/5081 |

* cited by examiner

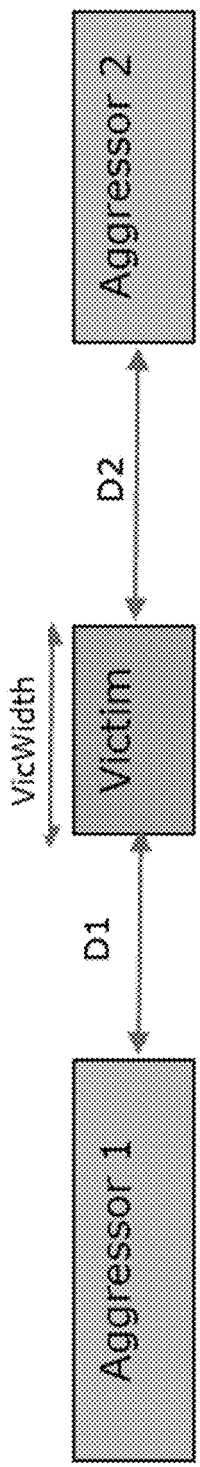
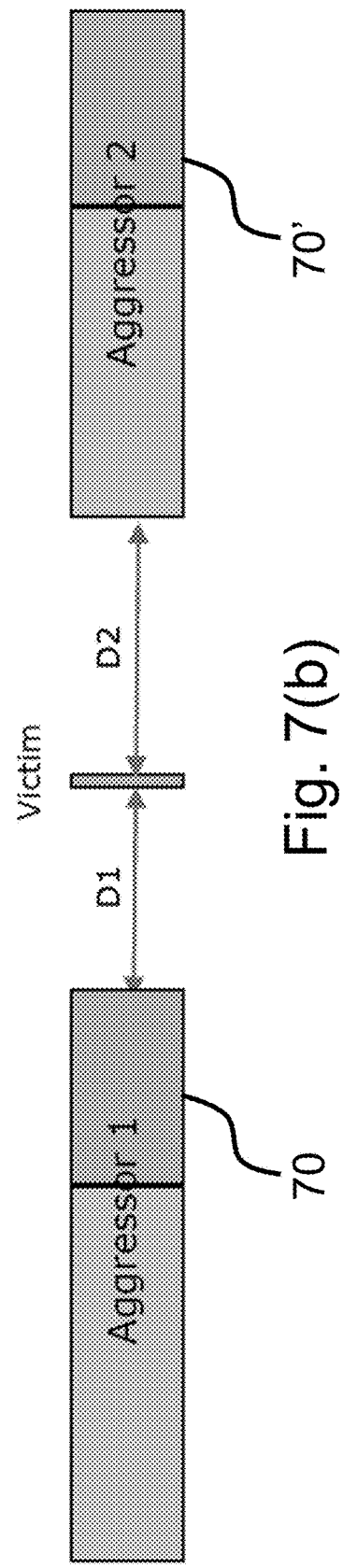
Fig. 7(a)
Fig. 7(b)

METHOD AND SYSTEM FOR TIMING ANALYSIS WITH ADAPTIVE TIMING WINDOW OPTIMIZATION FOR DETERMINING SIGNAL INTEGRITY IMPACT

BACKGROUND OF THE INVENTION

The subject method and system are generally directed to efficient yet accurate timing analysis for an electronic circuit design to verify compliance with the various timing constraints applicable thereto. More specifically, the subject method and system provide for optimization of timing windows for certain nodes of the electronic circuit design to facilitate the determination of certain signal integrity effects on timing, such as those due to crosstalk. The subject method and system thereby alleviate undue pessimism or optimism in the computation of such effects for certain timing paths defined through the electronic circuit design.

Various static timing analysis measures are known in the art. A static timing analysis (STA) is carried out to assess the timing of digital circuits using software techniques and certain models that provide relevant characteristics of the circuit in question. Electronic Design Automation (EDA) is widely employed for software design of such circuits, as part of the overall design and fabrication process. An EDA flow encompasses numerous stages, including a timing verification stage; and, STA is particularly useful when employed in the timing verification stage of an electronic circuit design, though it may be employed in connection with other EDA stages.

STA is carried out generally to compute the worst case and best case timing delays for all possible signal paths through the cells of a given circuit, without regard for logical operation. The circuit design is broken down into subsections traversed by various types of timing paths which collectively cover each and every combination of starting and ending points to determine the possible propagation delays therethrough. The timing information obtained is then compared to the timing constraints applicable to such paths. The timing constraints typically reflect such parametric factors as clock period, timing characteristics of certain inputs/outputs of the circuit, and the like.

The circuit design's compliance with applicable timing constraints may then be verified without having to precisely track each and every one of the possible signal paths. This enables relatively fast and computationally simple timing verification, especially for larger, more complex circuit designs. STA thus provides an efficient alternative to more computationally intensive measures for timing constraint verification like actual circuit simulation runs on the circuit design.

Different STA methodologies are known. They include graph based analysis (GBA), as well as the more exhaustive path based analysis (PBA). Such STA methodologies are carried out to analyze the timing of signal setup and signal hold delays, which are typically measured in terms of slack at certain nodes of the circuit, or the difference between required and arrival times of a signal at a node. Positive slack would indicate room for additional delay without detrimental effect on the overall circuit delay. Negative slack would indicate excessive delay in the timing path leading to that node requiring remedial measures to avoid detrimental effect on the speed of overall circuit operation.

In GBA, the various input models are read in, and a persistent model of STA is built. That is, the software executes to create internally a timing graph for the given netlist, then computes the worst arrival and required times at the various nodes of the graph. For certain nodes which may be characterized as endpoints, it also computes the worst slack.

The more exhaustive, computationally burdensome PBA methodology is an extension to GBA, and is typically used to target pessimism reduction that may have been introduced at various stages of GBA.

Yet the reliability of timing analysis is plagued by sources of undue pessimism and optimism. These sources vary. The types of pessimism introduced during GBA analysis, for instance, include:

1. Slew merging pessimism impacting delay computation on the timing network;
2. Graph based derating factors (advanced on-chip-variation factors); and,
3. Signal Integrity (SI) effects.

Various signal integrity (SI) analysis measures are also known in the art. SI analysis is carried out to verify the fidelity of signals passing from a certain driver component to a certain receiver component of a given electronic circuit design through a transmission line interconnect. SI analysis serves to characterize the quality of transmitted signals through physical interconnects employed in the circuit design like traces, connectors, vias, etc.

Efforts to address SI effects like crosstalk delay in the context of STA analysis have been made in the art. During the course of STA analysis, certain SI analysis measures, such as the so called path mode and overlap mode of crosstalk delay analysis, are employed to account for crosstalk effects in the given circuit design. But optimism is intrinsic to the path mode of such SI analysis; and, this optimism tends for example to cause undue optimism in GBA slacks. Conversely, pessimism is intrinsic to the overlap mode of such SI analysis; and, this pessimism tends for example to cause undue pessimism in GBA slacks. There is therefore need for a timing analysis approach which optimizes the SI analysis supporting GBA or other such timing analyses, by alleviating this undue pessimism and optimism in an efficient yet reliable manner.

SUMMARY OF THE INVENTION

It is an object of the present invention to provide a method and system for simply yet effectively carrying out timing analysis for an electronic circuit design which alleviates undue pessimism and optimism.

It is another object of the present invention to provide a method and system for executing STA with SI analysis to determine crosstalk delay to preserve reliability.

It is yet another object of the present invention to provide a method and system which executes STA with reliable yet computationally efficient determination of signal integrity delay impact.

These and other objects are attained in a method is provided for timing analysis of an electronic circuit design having a plurality of cells interconnected at a plurality of nodes. A timing graph is established which defines a plurality of timing paths through different subsections of the electronic circuit design. A timing window is defined for each of the nodes included in at least one timing path, with the timing window of each node having early and late edges respectively defining worst case early and late signal arrival times at the node. At least one preliminary round of a predetermined signal integrity analysis is executed on the electronic circuit design based on the timing windows of the nodes to identify at least one pair of the nodes as victim and aggressor (or attacker) nodes subject to crosstalk coupling. The timing window of each victim node is adaptively adjusted according to a predetermined timing property acquired therefor to form an optimized timing window for the victim node. At least one primary round of the predetermined signal integrity analysis is executed on the electronic circuit design based in part on the optimized timing window for each victim node to generate a delay. The delay is annotated to the timing graph; and, a predetermined static timing analysis is executed based on the annotated timing graph to generate an optimized timing report.

In accordance with certain embodiments, a system is provided for timing analysis of an electronic circuit design having a plurality of cells interconnected by a plurality of nets. The system comprises a computer readable data storage portion storing a plurality of input models, the input models including a netlist defining the electronic circuit design and a plurality of timing constraints respectively. The system also comprises a timing analysis engine configured to execute a predetermined static timing analysis based upon the input models acquired from the data storage portion. The timing analysis engine establishes a timing graph defining a plurality of timing paths through different subsections of the electronic circuit design. The timing analysis engine executes a preliminary round of a predetermined signal integrity analysis to define a timing window for each of the nodes included in at least one timing path, the timing window of each net having an early and late edges respectively defining worst case early and late signal arrival times at the net. The timing analysis engine determines based on the timing windows at least one pair of the nets as victim and aggressor nets subject to crosstalk coupling. The system comprises also a timing window optimization unit coupled to the timing analysis engine. The timing window optimization unit includes a victim window portion that executes to adaptively adjust the timing window of each victim net according to a predetermined timing property acquired therefor to form an optimized timing window for the victim net. The timing analysis engine executes at least one primary round of the predetermined signal integrity analysis on the electronic circuit design based in part on the optimized timing window for each victim net to generate a delay. The timing analysis engine then executes the predetermined static timing analysis based on the timing graph annotated with the delay to generate an optimized timing report.

In accordance with certain other embodiments of the present invention a method is provided for timing analysis of an electronic circuit design having a plurality of cells interconnected at a plurality of nodes. A timing graph is established which defines a plurality of timing paths through different subsections of the electronic circuit design. A timing window is defined for each of the nodes included in at least one timing path, the timing window of each node having early and late edges respectively defining worst case early and late signal arrival times at the node. At least one preliminary round of a predetermined signal integrity analysis is executed on the electronic circuit design based on the timing windows of the nodes to identify at least one pair of the nodes as victim and aggressor nodes subject to crosstalk coupling. The timing window of each said victim node adaptively is adjusted according to a predetermined timing property acquired therefor to form an optimized timing window for the victim node. The adaptive adjustment of the timing windows includes the following exceptions. For each victim node having a false path occurring on at least one timing path defined therethrough, the timing window of that victim net is preserved as the optimized timing window therefor. Likewise, for each victim node having a multi-cycle path occurring on at least one timing path defined therethrough, the timing window of that victim net is preserved as the optimized timing window therefor. For each victim node having a clock path defined therethrough, the timing window is preserved as the optimized timing window therefor. For each victim node having a common path pessimism reduction (CPPR) adjustment occurring on at least one timing path defined therethrough, at least one of the early or late edges of the timing window is effectively defined with a range of uncertainty expanded by the worst case CPPR adjustment. A primary round of the predetermined signal integrity analysis is executed on the electronic circuit design based in part on said optimized timing window for each said victim node to generate a delay. The delay is annotated to the timing graph; and, a predetermined static timing analysis is executed based on the annotated timing graph to generate an optimized timing report.

BRIEF DESCRIPTION OF THE DRAWINGS

FIG. 7(a) is a schematic diagram illustrating timing windows of the nets, in a sample case where a victim net is attached by two separate aggressor nets;

FIG. 7(b) is a schematic diagram illustrating the timing windows of the nets shown in FIG. 7(a) after transformation, the victim net being converted to a victim edge and each aggressor net accordingly expanded;

FIG. 8-1 is the first of three parts of a flow diagram generally illustrating a flow of processes generally executed by the embodiment of FIG. 1, in accordance with one exemplary embodiment and implementation of the present invention;

FIG. 8-2 is the second of three parts of a flow diagram generally illustrating a flow of processes generally executed by the embodiment of FIG. 1, in accordance with one exemplary embodiment and implementation of the present invention;

FIG. 8-3 is the third of three parts of a flow diagram generally illustrating a flow of processes generally executed by the embodiment of FIG. 1, in accordance with one exemplary embodiment and implementation of the present invention;

DETAILED DESCRIPTION OF THE PREFERRED EMBODIMENTS

Briefly, the subject method and system provide for timing analysis of an electronic circuit design which accurately and efficiently takes into account such signal integrity effects as crosstalk on the timing characteristics of circuit operation. The system and method provide for execution of a timing analysis engine incorporates suitable SI analysis measures based on adaptively adjusted timing windows for certain crosstalk-coupled nodes of the electronic circuit design. Undue pessimism or optimism is thereby reduced in the crosstalk delay computed for certain timing paths defined through cells of the electronic circuit design, and the reliability of timing verification (for compliance with applicable constraints) accordingly preserved.

In accordance with certain aspects of the present invention, the timing analysis engine incorporates timing window optimization measures in support of the crosstalk delay computation executed as part of the static timing analysis it carries out. This adaptively curtails the undue optimism and pessimism in the crosstalk delay computations. In certain exemplary embodiments and applications, the timing analysis engine incorporates the timing window optimization measures to provide GBA timing analysis, which incorporates crosstalk delay computation that is more pessimistic when compared to conventional path mode computation of delay, but less pessimistic when compared to conventional overlap mode computation of delay.

Figure 1:
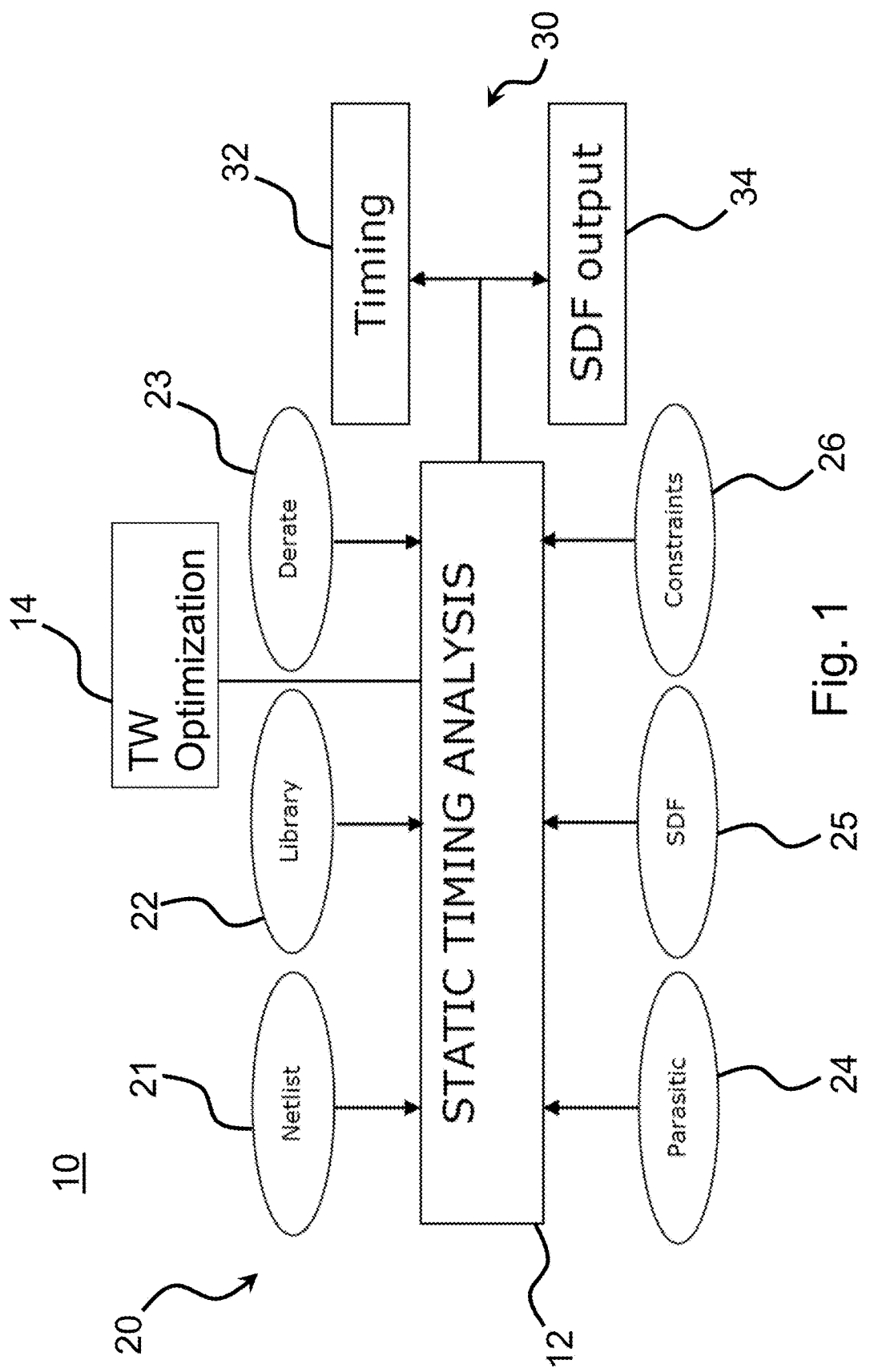
FIG. 1 is a schematic diagram illustrating a timing analysis system formed in accordance with one exemplary embodiment of the present invention, as applied to an electronic circuit design in one illustrative application.

FIG. 1 schematically illustrates a timing analysis system 10 formed in accordance with one exemplary embodiment of the present invention. System 10 includes a computer processor-based timing analysis engine 12 configured to execute a predetermined STA of any suitable type known in the art. The timing analysis engine 12 is also configured in accordance with certain aspects of the present invention to execute a predetermined SI analysis of any suitable type known in the art to compute delays due to one or more applicable SI effects. In the illustrated embodiment and implementation, system 10 is configured to execute suitable SI analysis to compute such timing-related effects as crosstalk delay at various nets victimized by crosstalk 'attack' from other aggressor nets capacitively coupled thereto. System 10 includes in this regard a timing window optimization unit 14 which adaptively adjusts a victim net's timing window for use by the given SI analysis to account for crosstalk delay with enhanced accuracy and efficiency.

The timing analysis engine 12 is coupled to a plurality of predetermined input models that provide various data, parametric values, and the like pertaining to a given electronic circuit design that the engine needs in order to perform suitable static timing analysis. These input models include a netlist 21 that defines the given electronic circuit design in terms of its intercoupled components, namely its constituent circuit cells and interconnects. Generally, a gate level netlist is provided as an input model to define the circuit design's operational functionality.

Various kinds of library models 22 may be accessed by the engine 12 to obtain relevant delay and other such operational parameters of the circuit design's component cells, such as digital logical gates. Standard library models often employed in this regard include, for example, Liberty format specified .lib library models for defining the delays of standard digital gates (AND, OR, NOT, FLOP, LATCH etc.). They also include such models as the so-called MACROS (resources treated as proprietary Intellectual Property by a designer, which provide specific function features without divulging internal details), AOCV (Advanced On Chip Variation) models for performing certain advanced STA, and CDB (Celtic Data Base) models for performing crosstalk delay analysis. The choice of library models to be employed will depend on the particular requirements of the intended application.

Similar to the constituent gates, suitable models are preferably accessed for interconnects included in the given netlist. Such models for interconnects are specified in the so-called SPEF (Standard Parasitic Exchange Format) or other suitable format known in the art.

Other modelling information typically obtained for many STA applications include timing 'derates' 23 which model the variation impact on timing properties (such as on chip variations) due to the characteristics particular to a physical implementation for the given circuit design. The 'derates' may be expressed as derating factors to be applied to the values of certain reported timing properties. A parasitic model 24 provides information relating to capacitive and/or other parasitic effects in the circuit design bearing on timing properties. An SDF (standard delay format) model 25 may provide another/additional specification of certain input delays of gates and interconnects. These and other such models known in the art may be accessed by the timing analysis engine 12 to provide predetermined parametric information as needed, depending on the particular requirements of the intended application.

In addition, a set of predetermined system level constraints 26 are provided to guide the timing analysis carried out by engine 12. This set of input constraints are applied to define the acceptable limits for the operational timing of the given circuit design. The constraints may be provided in any suitable form known in the art consistent with the requirements of the STA carried out by the engine 12 in the intended application.

The timing engine 12 generates output 30 which may be in any form suitable for the intended application. The output 30 preferably includes at least a set of timing reports 32 that classify the whole circuit design into various signal timing paths for different subsections of the circuit design with indication as to whether each path meets the applicable constraints. The output 30 preferably also includes a suitable set of SDF outputs 34 representing various delay and timing data for use as needed during any other stage of the given EDA flow.

Figure 2:
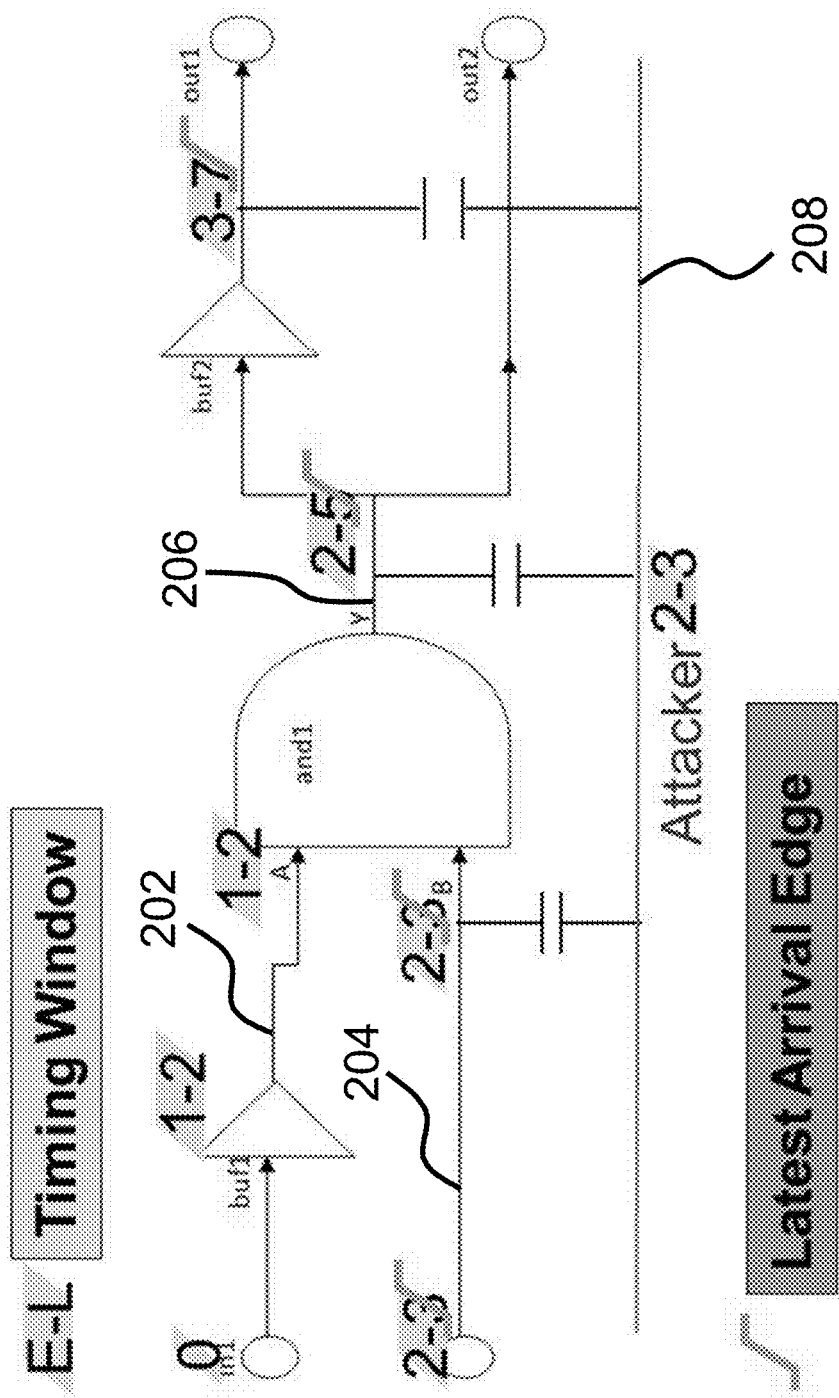
FIG. 2 is a graphically annotated schematic diagram illustrating sample operation of a portion of the embodiment shown in FIG. 1, upon a sample subsection of the electronic circuit design.

Turning now to FIG. 2, a schematic diagram is shown of a sample subsection of a sample electronic circuit design, in this case a digital circuit subsection whose cells include first and second buffers buf1, buf2 and a logic AND gate and1 that are interconnected as shown between pairs of input and output nodes in1, in2 and out1, out2. The schematic diagram is shown annotated accordingly with the instant at which certain signals occur at various nodes (nets) 202, 204, 206 connected to the cells, and with the intervals during which certain switching transitions occur the various nodes. As shown, the time instants and time intervals are expressed in terms of unit time increments. For example, a signal appears at input node in1 in the illustrated case at unit time 0, while a signal appears at input node in2 two (2) unit time increments later and transitions at some point during the interval between unit times 2-3. Similarly, switching signals occur at the nodes 202, 204 connected to the A and B input pins of the gate and1 during the respective unit time intervals 1-2 and 2-3, and at the node 206 connected to the output pin y of gate and1 and at the output node out/during the respective unit time intervals 2-5 and 3-7.

These switching intervals represent the intervals during which the earliest through the latest (E-L) arriving instances of the same signal would reach a particular node in the timing graph. As such, the switching intervals constitute the Timing Windows (TW) of their corresponding nodes. Timing windows are also referred to in the art as arrival-windows or switching windows. A node may have multiple TWs corresponding to multiple clocks/phases that may apply at different instances. A timing window for a particular node is represented herein graphically as a parallelogram with the left and right sloped 'edges' representing the earliest and latest signal arrival time limits at that node, and notationally as follows: [earliest arrival time, latest arrival time].

The sample circuit subsection of FIG. 2 could be subject to crosstalk effects during operation after physical implementation, as indicated by additional annotations. Crosstalk occurs due to undesired coupling between neighboring channels or circuits. That is, when a signal transmitted through one channel/circuit causes undesirable effect in a signal concurrently transmitted in the neighboring channel/circuit. Due for instance to unintended capacitive, inductive, or conductive coupling between the channels/circuits, transition of a signal in one may cause sufficient crosstalk effect to impart delay to a signal occurring in the other.

Within a given circuit design, such crosstalk delay may be caused during periods of concurrent signal transmission through neighboring traces, lines, or other such conductive elements (generally referred to as "nets") forming the various nodes of a circuit. The net whose signal transmission imparts crosstalk effect on the other is commonly referred to as the aggressor net, while the affected net is commonly referred to as the victim net.

Crosstalk delay computation is necessarily impacted by the respective signal switching windows of the Victim and Aggressor Nets. By definition, the occurrence of signal transmissions on the nets must coincide for crosstalk delay to occur. Hence, the switching windows of the nets, or their timing windows, must overlap to some extent for crosstalk delay to affect a victim net.

The victim-aggressor characterization for paired nets is relative, depending on the particular instance of coupling between those nets. A net may be the aggressor in certain coupling situations and the victim in other coupling situations, even where the characterization is with respect to the same neighboring net. Often there are mutual crosstalk effects between the nets of a victim-aggressor related pair; and, the definition of victim/aggressor merely depends on which net is being analyzed. The net being analyzed is taken as the victim for purposes of that analysis, while the other is taken as the aggressor for purposes of that analysis.

In the circuit subsection example of FIG. 2, a node/net 208 is capacitively coupled to each of the nets forming the nodes 204, 206, and out1. Signal transmission occurs through this net 208 at some point within the time interval 2-3. This net 208 then serves as an attacker (or aggressor) net as to potential victims at nets 204, 206, and out1, if signal transmission through such victim nets coincides in time with signal transmission through the attacker net 208. In that case, crosstalk delay is imparted to the victim net by this coupling. To preserve accuracy of timing analysis, this crosstalk delay effect must not escape detection/consideration. Yet, unduly optimistic timing analysis may for instance obviate certain otherwise proper overlaps between potential attacker-victim TWs, and unduly pessimistic timing analysis may for instance needlessly consider overlaps between TWs of net pairs having no effectual attacker-victim relationship.

STA with Crosstalk Delay

As described in preceding paragraphs, STA systems known in the art incorporate suitable SI analysis measures to account for such signal integrity effects as crosstalk delay. But timing results may vary depending on the STA methodology employed. With GBA operation, for instance, the timing results obtained in view of these signal integrity effects may not be as reliable as those obtained with PBA operation. As also described in preceding paragraphs, STA systems known in the art suitably employ the so-called path mode and overlap mode of SI analyses to compute applicable crosstalk delays at given nodes of the circuit design. The computed delays are then annotated to the timing graph, and STA is carried out on the delay-annotated timing graph.

While each of the path mode and overlap mode approaches offers advantages, they yield either undue optimism or pessimism in the determination of crosstalk delay for some nodes of the given circuit design. This adds to the potential for error in timing verification.

In path mode, the crosstalk delay imparted to a victim net is computed using just the late edge of the victim net's TW in the case of max crosstalk delay computation, and just the early edge of the victim net's TW in the case of min crosstalk delay computation, while the complete TW is used for the aggressor net. The computed crosstalk delay is then indiscriminately applied for all the edges/paths through the victim net. This leads to undue optimism as to crosstalk delay for some paths.

More specifically, such path mode of GBA analysis tends to be optimistic, as this mode of analysis does not consider the complete switching range (TW) of the victim net. The inherent optimism of the approach is not helpful to designers signing-off their chips using GBA analysis. Nor is this optimism helpful for those designers signing-off their chips using PBA analysis, because GBA analysis is usually performed on those paths found to be in violation of timing constraints. Moreover, with optimistic GBA, PBA would need to be done on GBA-positive slack paths as well.

In overlap mode, the TWs of the victim nets as well as the aggressor nets are augmented (or padded) at both their early and late edges by a predetermined interval of time—for instance, by a half-slew (the time it takes for a given signal to transition between states at its effective slew rate). The resulting TWs are used to compute a worst-case crosstalk delay on the victim net. The crosstalk delay imparted to a victim net is then computed using that edge of the padded TW which experiences worst-crosstalk delay. The computed crosstalk delay and is then applied for all the edges/paths through the victim net. This leads to undue pessimism of crosstalk delay for some paths.

Overlap mode resolves the GBA optimism that results with path mode computation of crosstalk delay. It also yields bounding GBA delays compared to PBA. Nonetheless, the excessive pessimism resulting with overlap mode has numerous implications on the design flow, which include for example:

1. An increase in the number of paths needing to be retimed using PBA;
2. The need to fix false setup-hold violations; and,
3. Limited room for leakage fixing;

In the context of PBA, certain requirements are imposed on the quality of GBA analysis, both from a tool perspective and from a designer perspective. From a PBA analysis tool perspective, GBA slacks are required to be pessimistic enough to bound PBA slack without being excessively pessimistic. Excessive pessimism would increase the number of paths needing to be re-timed, potentially raising serious performance implications. From a designer perspective, GBA slacks must be pessimistic enough to flag all violations, for a path that is falsely reported by an optimistic GBA as non-violating is not likely to be re-timed during PBA. This leads to potential chip failures upon physical implementation of the circuit design.

In the context of optimization flows, an unduly pessimistic GBA would mean timing violations (setup/hold) being fixed necessarily at the cost of increased power/area. Likewise, leakage reclaim for fixes carried out on positive slack paths (typically by upsizing the cells on positive slack paths) may be adversely affected by an unduly pessimistic GBA. Since power savings increases with positive slack, an unduly pessimistic GBA would inhibit leakage reclaim.

In accordance with certain aspects of the present invention, the subject method and system carry out timing window optimization to curtail undue pessimism and/or optimism in computing crosstalk effects, such as the delay due to crosstalk impact at victim nodes/nets. The timing window optimization includes adaptively adjusting the victim net's TW, taking into consideration certain timing properties of that victim net, then using the resulting optimized TW for the victim net instead of the full TW otherwise formed by earliest Early and latest Late signal arrival times expected at the net. These timing properties help to identify relevant portions of the victim net's full/original timing window derived from valid timing paths through the victim net. Since the relevant part is typically but a portion of the full TW, there is significant pessimism reduction in the crosstalk delay computed for the victim net using conventional techniques like path and overlap modes of analysis. In certain cases, a timing property prompts an exception to the process, whereby the full TW is preserved effectively as the optimized TW.

Some examples of various timing properties that may be considered in forming the optimized timing window (depending on the requirements of the particularly intended application) include:

a. False path exception through the victim net;
b. Multi-cycle paths exception going through the victim net;
c. Victim net forming part of a clock path; and,
d. CPPR adjustment occurring in paths going through the victim net.

The full timing windows for aggressor nets may be suitably created and employed much as conventionally done, for instance, in path mode. But the timing window optimization disclosed herein preferably further includes reduction of the optimized victim TWs to a relevant victim edge (preferably, either its early or its late edge, depending for instance on whether early or late timing analysis is carried out). The full TW for each of the victim's aggressor nets is then expanded accordingly to preserve the time separation distance to the victim edge to remain the same as before expansion (between that aggressor's unexpanded TW and nearest edge of the victim's optimized TW).

Consequently, a method and system formed in accordance with certain exemplary embodiments of the present invention perform crosstalk analysis for a victim net impacted by crosstalk coupling of one or more aggressor nets using an optimized timing window which adaptively represents just the valid timing paths through such victim net. This serves to ensure a bounded (worst-case) graph based crosstalk analysis. The adaptively optimized victim window then more accurately bounds the victim edge employed in path mode for crosstalk delay computation, and is in turn bounded by the time-padded window used in Overlap Mode for crosstalk delay computation.

Figure 3:
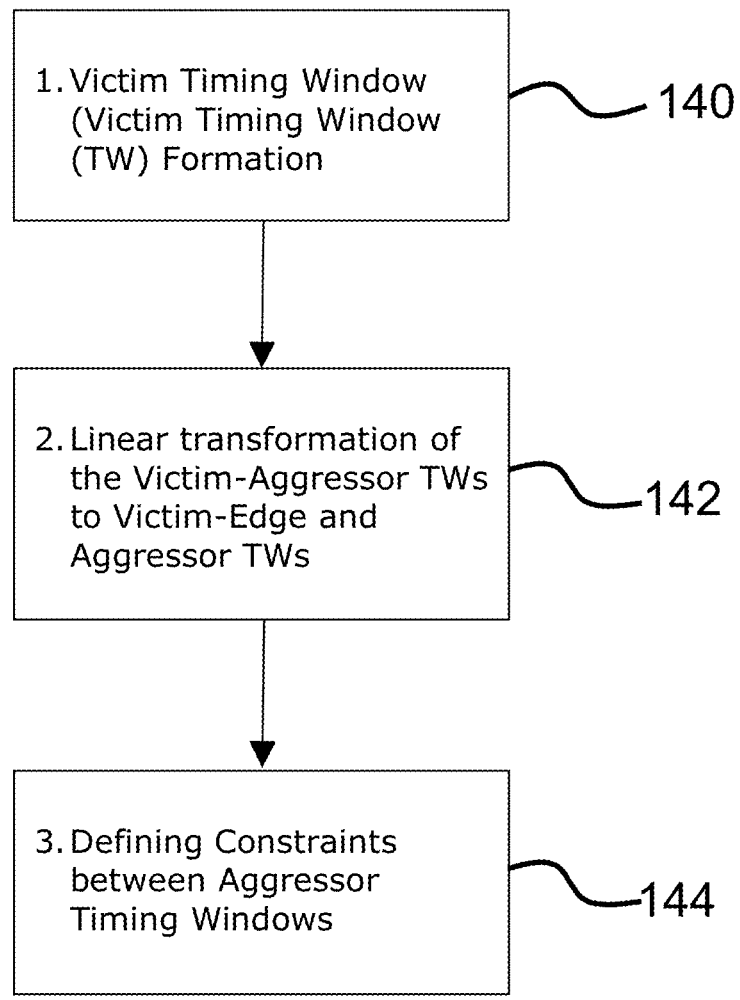
FIG. 3 is a schematic diagram illustrating a portion of the embodiment shown in FIG. 1.

Referring now to FIG. 3, there is shown a schematic diagram illustrating the main functional portions preferably implemented in one exemplary embodiment of the timing optimization unit 14 (shown in FIG. 1). The timing optimization unit 14 generally includes a victim window portion 140, a window transformation portion 142, and a constraint generation portion 144 intercoupled to carry out a preferred flow for optimizing the victim and aggressor net timing windows in the illustrated embodiment. These timing optimization unit 14 portions are suitably implemented in software executed on one or more computer processors, and contribute to determining accurate and efficient crosstalk delay computation for the given static timing analysis performed by the timing analysis engine 12. The optimization portions 140, 142, 144 serve not only to optimally adapt the victim timing windows sufficient so as to remove undue pessimism or optimism from crosstalk delay computations, but preferably serve also to collapse these optimized timing windows of the victim nets to be represented as a discrete edge. This facilitates the execution of known crosstalk computation measures such as path and overlap modes of delay analysis, which reference the relevant edges of victim nets' timing windows for crosstalk delay computation. The optimization portions preferably also adapt the aggressor windows accordingly to accommodate this transformation of victim timing windows to victim edges. Each aggressor net corresponding to a victim net is suitably expanded by the width of the victim's optimized TW, so that any time distance separation between aggressor-victim timing windows before the transformation from optimized victim TW to victim edge is preserved between the aggressor TW and victim edge after transformation.

The victim window portion 140 executes to adaptively adjust the timing window of each victim net identified through one or more preliminary rounds of static timing analysis. This timing window adjustment is made according to one or more predetermined timing properties of the particular victim net in question. These timing properties may be suitably acquired from one or more input models of the timing analysis engine 12 (such as illustrated in FIG. 1), or may be otherwise acquired through known measures available in the particularly intended application. While other timing properties may be used to suit the particularly intended application, the victim window portion 140 preferably takes the following timing properties into account, which help to identify those portions of a given victim net's full timing window pertaining to valid (or otherwise effectual) timing paths through that victim net. The victim's full timing window is accordingly adjusted to remove extraneous window portions to obtain an optimized version of the timing window; and, it is that optimized version of the timing window which is operated upon for crosstalk delay computation through such measures as path or overlap modes of crosstalk delay analysis.

The victim window portion 140 preferably takes into account a plurality of timing properties in this regard. As mentioned in preceding paragraphs, examples of such timing properties include the presence of a false path exception in one or more timing paths passing through the given victim net. A full TW of a victim net in GBA static timing analysis includes the earliest and latest signal arrival times of all possible timing paths through that net, without regard to whether the timing paths correspond to paths for actual/critical signal propagation through that net, and therefore effectual to circuit operation. The full TW therefore often includes the signal arrival times attributed to false paths, namely those timing paths that do not actually correspond to such effectual paths.

Figure 4:
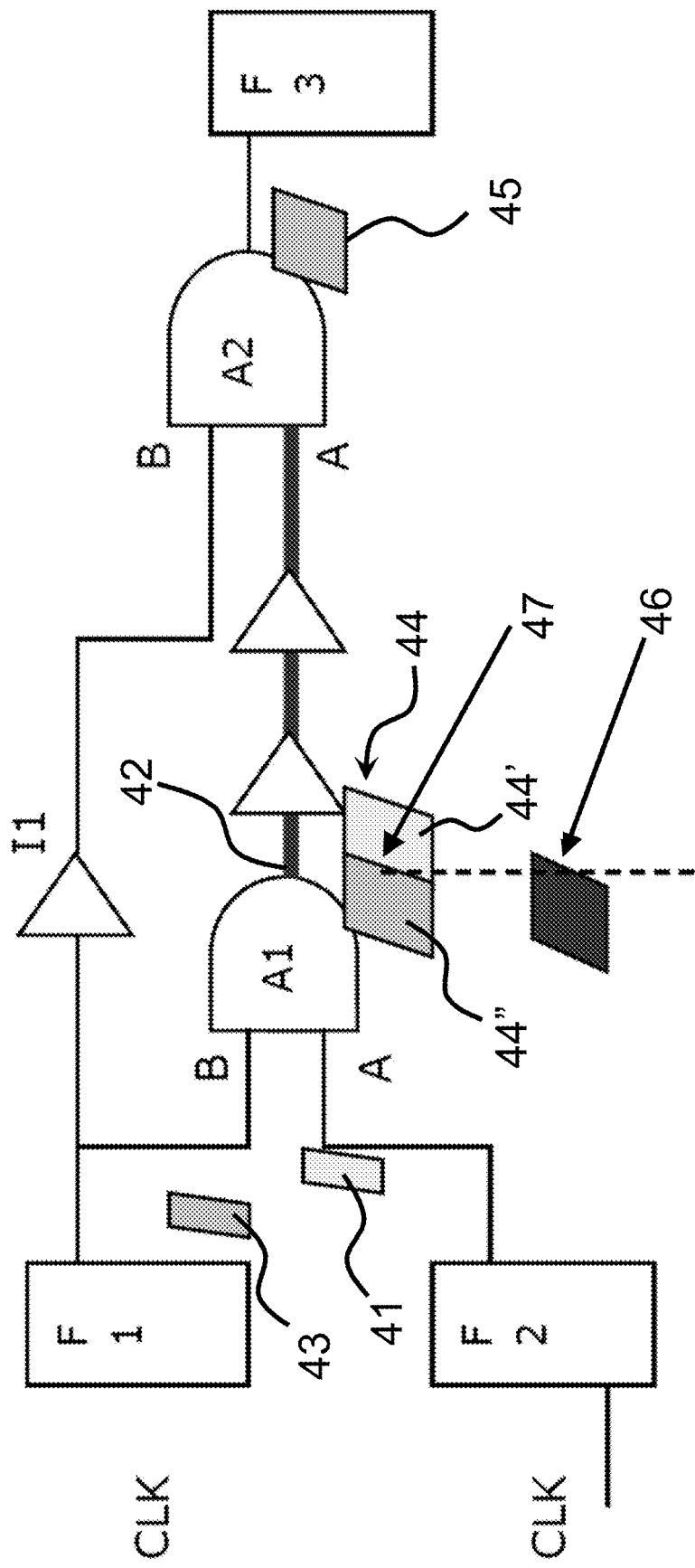
FIG. 4 is a graphically annotated schematic diagram illustrating optimization of a victim timing window, where the victim net is subject to a predetermined timing property, during operation of the embodiment of FIG. 1, upon a sample subsection of the electronic circuit design.

Turning to the explanatory diagram of FIG. 4, a sample circuit subsection 40 is schematically illustrated. The input nets, or nodes, A and B of the sample circuit's NAND gate A1 are shown annotated with their respective TWs 41, 43 graphically indicated. The output net 42 of the NAND gate A1 is shown with the full TW 44 graphically indicated. This output net 42 is one of several victim nets subject to crosstalk coupling by a nearby aggressor net (not shown), as graphically indicated by the thicker line weight. The TW 46 of the attacking aggressor net is graphically indicated for reference with respect to the TW 44 of the victim net 42. The TW 45 of the output net between the NAND gate A2 and flip flop F3 is also shown for reference.

In this illustrated example, the latest arrival time represented in the TW 44 of the victim net comes from a false path extending from the input A1/A on through to input A2/A. Hence, this false path-derived latest arrival portion 44' of the TW 44 is not timing critical. In addition, the net 42 does not experience crosstalk effect during this latest arrival portion 44' of the TW 44 because that TW portion 44' is spaced away from the aggressor TW 46. That is, the occurrence of signals within this latter portion 44' of the victim TW 44 is sufficiently displaced in time from the occurrence of signals within the aggressor TW 46 for any meaningful crosstalk delay impact. The actual/critical path germane to timing considerations, and therefore needs to be timed, has an arrival time at the net 42 occurring at an intermediate point within the victim TW 44. This arrival time occurs early enough to be impacted by the aggressor. For realistic crosstalk analysis, therefore, only the earlier portion 44" of the victim TW 44 should be used. In view of practical limitations (such as the inability to precisely delineate the noted portions of the victim TW 44), however, the full TW 44 is used to ensure use of the portion 44" encompassed thereby.

The victim window portion 140 in this case preferably executes to make exception to the adaptive adjustment of the victim TW 44 and preserves that TW 44 in full, which contains that portion of the TW attributable to the false path exception occurring on at least one timing path defined through the victim net 42. The effective late (latest arrival) edge 47 of this optimized window TW would be subject to significant crosstalk 'delta' delay, yet would not otherwise form the latest arrival edge of the original victim TW 44. Still, the TW 44 is preserved as the effectively optimized TW in the illustrated example such that the earlier portion 44' remains within the 'optimized' TW for the victim net 42.

Another example of a timing property taken into account by the victim window portion 140 is the presence of a multi-cycle path exception in one or more timing paths passing through the given victim net. A full TW of a victim net in GBA static timing analysis may include the signal arrival times attributed to multi-cycle paths, namely those timing paths in which data propagation from a certain starting point to a certain end point in the circuit subsection is meant to span multiple clock cycles. What might seem a critical path passing through a certain net in the context of single-cycle propagation may actually be a non-critical path through that net in the multi-cycle propagation context. The ambiguity may potentially cause unduly optimistic crosstalk analysis if the latest victim edge of the TW 54 (FIG. 5) is considered. The latest arrival time may come from such non-critical, multi-cycle path, and critical single-cycle path(s) having earlier arrival time(s) may lie obscured inside the TW if the full victim TW 54 were considered for crosstalk analysis of a net through which multi-cycle paths occur. Nonetheless, in practice for a real electronic circuit, the relevant portion of the victim TW cannot be computed precisely enough—due for instance to multiple possible paths going through the victim net. The full TW of the victim net is preferably employed as an exception to an optimized version of that TW.

Figure 5:
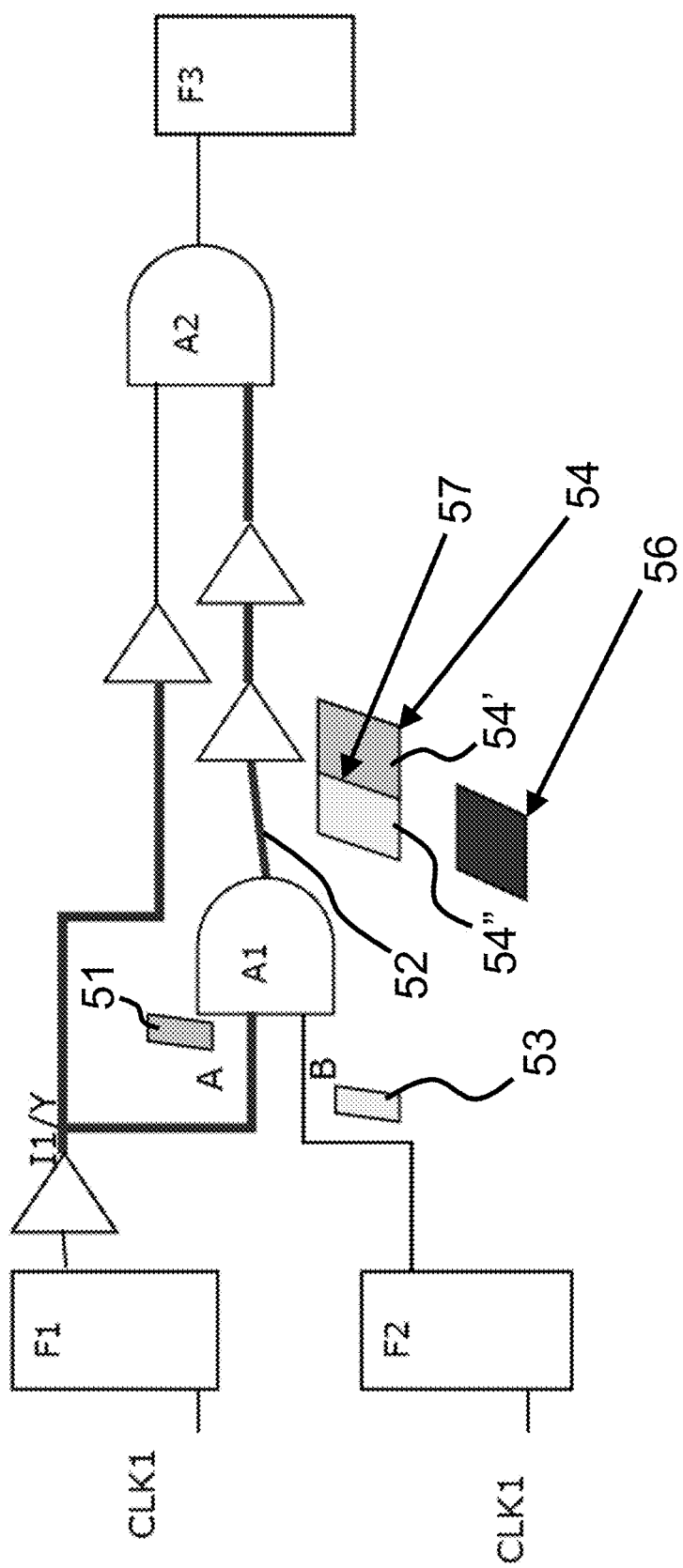
FIG. 5 is a graphically annotated schematic diagram illustrating optimization of a victim timing window, where the victim net is subject to another predetermined timing property, during operation of the embodiment of FIG. 1, upon a sample subsection of the electronic circuit design.

Turning to the explanatory diagram of FIG. 5, another sample circuit subsection 50 is schematically illustrated. The input nets A and B of the sample circuit's NAND gate A1 are also shown annotated with their respective TWs 51, 53 graphically indicated. Likewise, the output net 52 of the NAND gate A1 is shown with the full TW 54 graphically indicated. This output net 52 is one of several victim nets subject to crosstalk coupling by a nearby aggressor net (not shown), as graphically indicated by the thicker line weight. The TW 56 of the attacking aggressor net is graphically indicated for reference with respect to the TW 54 of the victim net 52.

In this illustrated example, the latest arrival time of the full TW 54 of the victim net 52 comes from a non-critical multi-cycle path traversing the net, which does not violate any timing constraints. On the other hand, the arrival time 57 lying intermediately within the victim TW 54 is attributable to a critical single-cycle timing path also traversing the victim net 52. If this arrival time 57 were to form an edge, it would yield significant crosstalk delta delay due to its alignment with the aggressor TW 56. For optimal crosstalk analysis, therefore, the arrival time 57 of the victim TW 54, ideally, would be used. As noted, however, in practice for a real electronic circuit, the relevant portion of the victim TW cannot be computed precisely enough—due for instance to multiple possible paths going through the victim net. The full TW of the victim net is preferably employed as an exception to an optimized version of that TW.

The effective late (latest arrival) edge 47 of this optimized window TW would be subject to significant crosstalk 'delta' delay, yet would not otherwise form the latest arrival edge of the original victim TW 44. Still, the TW 44 is preserved as the effectively optimized TW in the illustrated example such that the earlier portion 44' remains within the 'optimized' TW for the victim net 42.

The victim window portion 140 in this case preferably executes to make exception to the adaptive adjustment of the victim TW 54, and preserves that TW 54 in full, which contains that portion 54' of the TW attributable to a non-critical, non-violating multi-cycle path exception occurring on at least one timing path defined through the victim net 52. In the illustrated example, for instance, the full TW 54 would be preserved effectively as the 'optimized' TW for the victim net 52, ensuring that the portion 54" (terminating at the late edge 57) is encompassed, albeit with the ineffectual portion 54' present.

Another example of a timing property taken into account by the victim window portion 140 is the possibility of the victim net forming a part of a clock path. Clock nets would require both the Early/Late delays to be considered as part of both setup/hold analyses based on whether the net forms part of a launch or a capturing path. For victim nets found to constitute such a clock net, therefore, the victim window portion 140 preferably executes to preserve the full TW at the victim net as its optimized timing window.

Still another example of a timing property taken into account by the victim window portion 140 is the occurrence of a CPPR adjustment on at least one timing path defined through a victim net. In that case, the victim window portion 140 preferably executes such that the timing window at the victim net is effectively defined with at least one of the early or late edges thereof ranging in uncertainty to include the worst case CPPR adjustment occurring in any of the timing paths going through that net.

Figure 6:
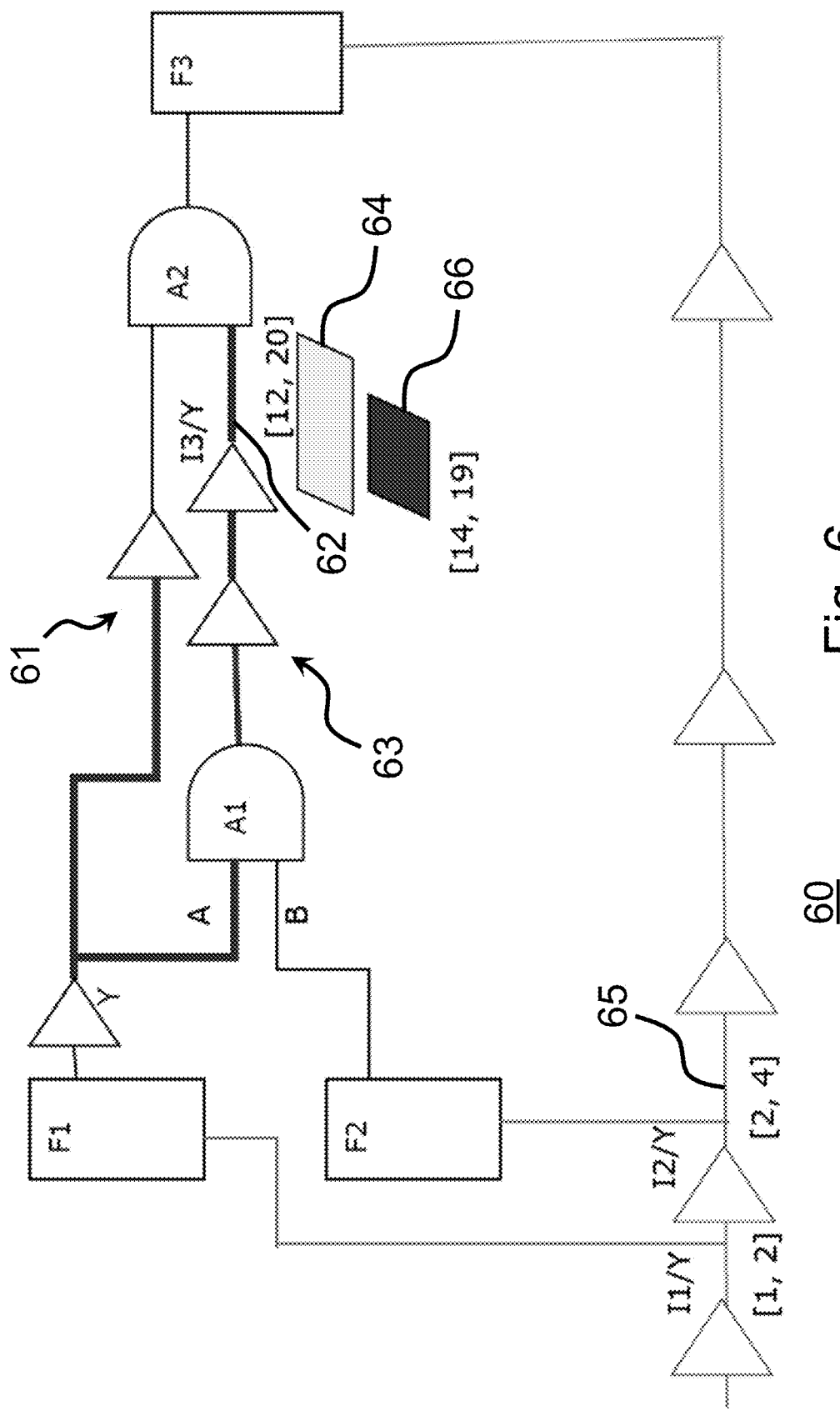
FIG. 6 is a graphically annotated schematic diagram illustrating optimization of a victim timing window, where the victim net is subject to yet another predetermined timing property, during operation of the embodiment of FIG. 1, upon a sample subsection of the electronic circuit design.
Figures 1, 8:
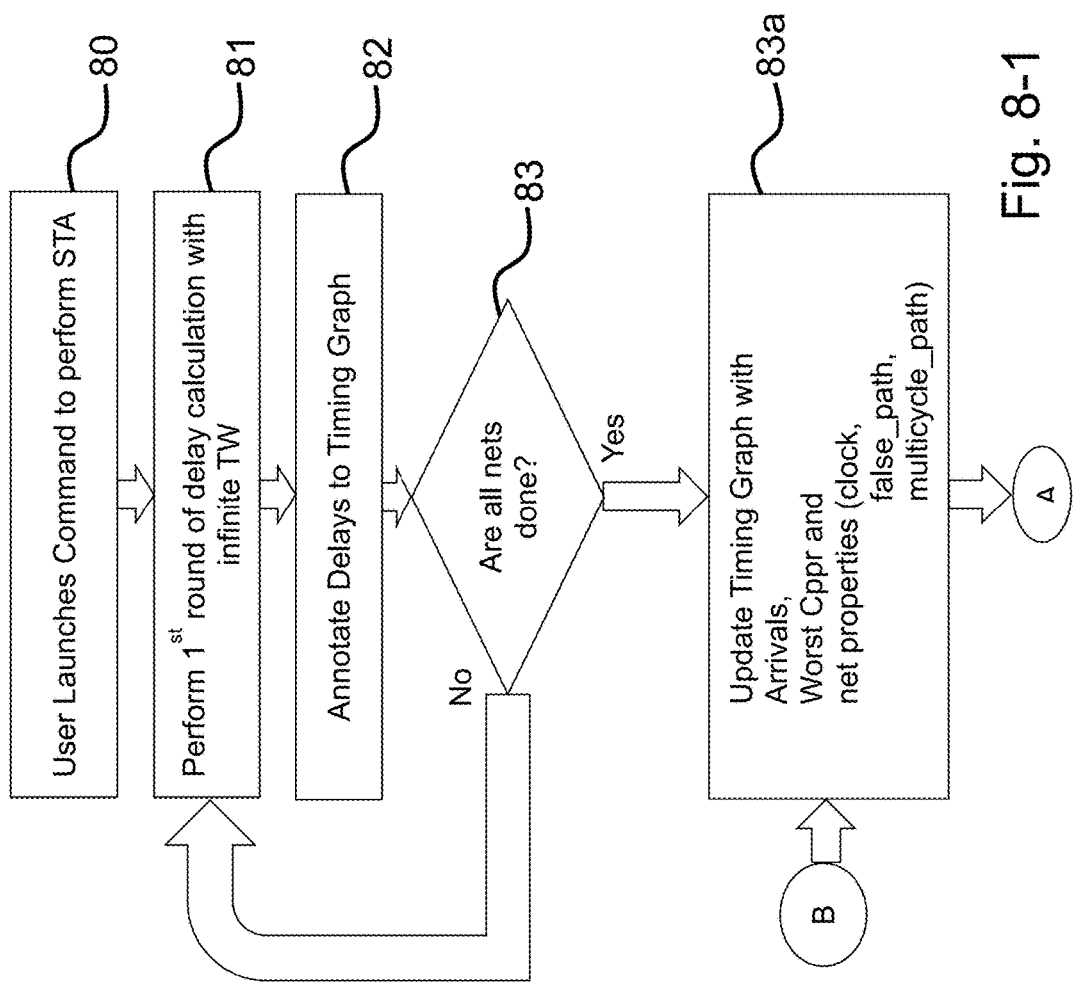
Figures 2, 8:
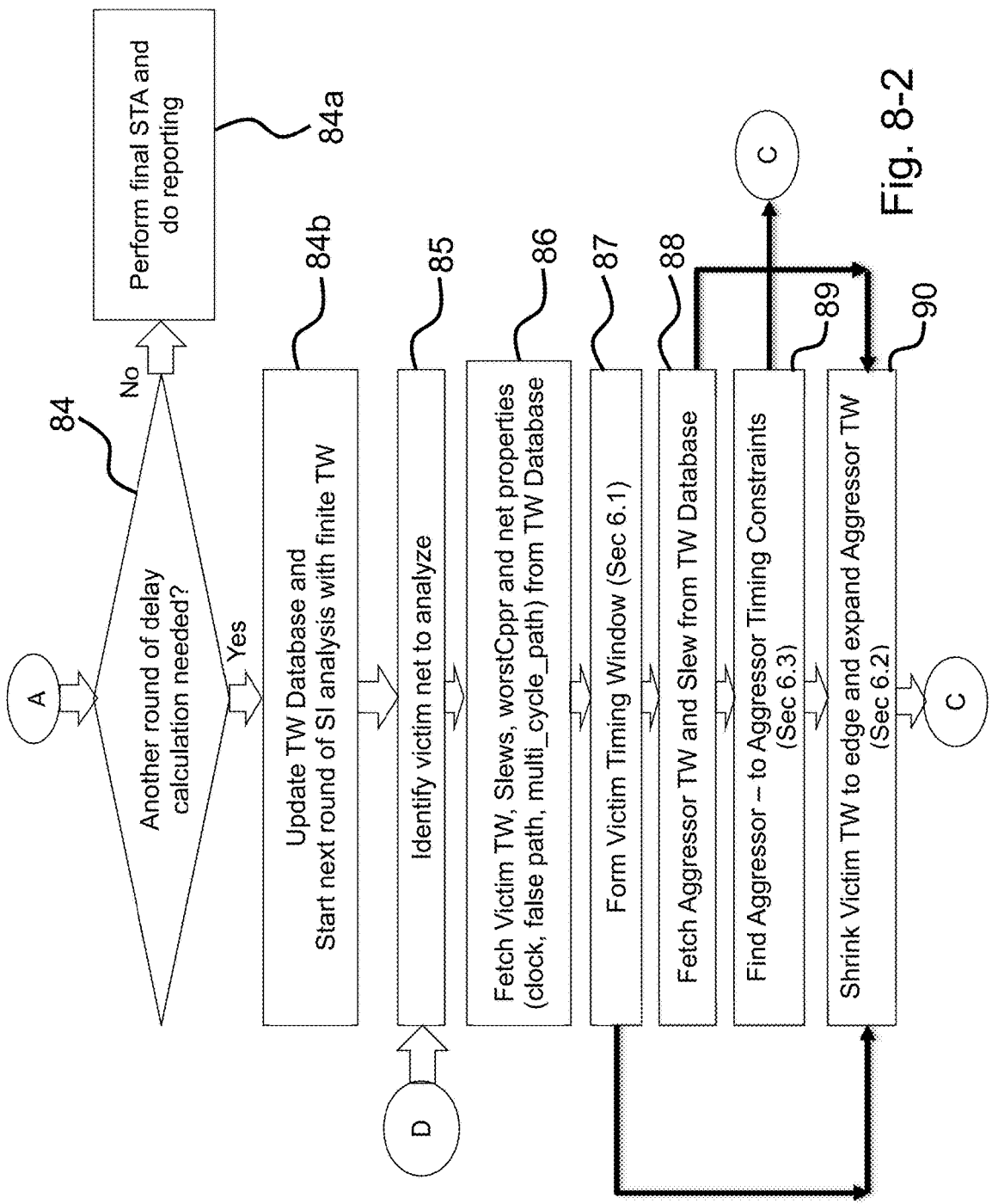
Figures 3, 8:
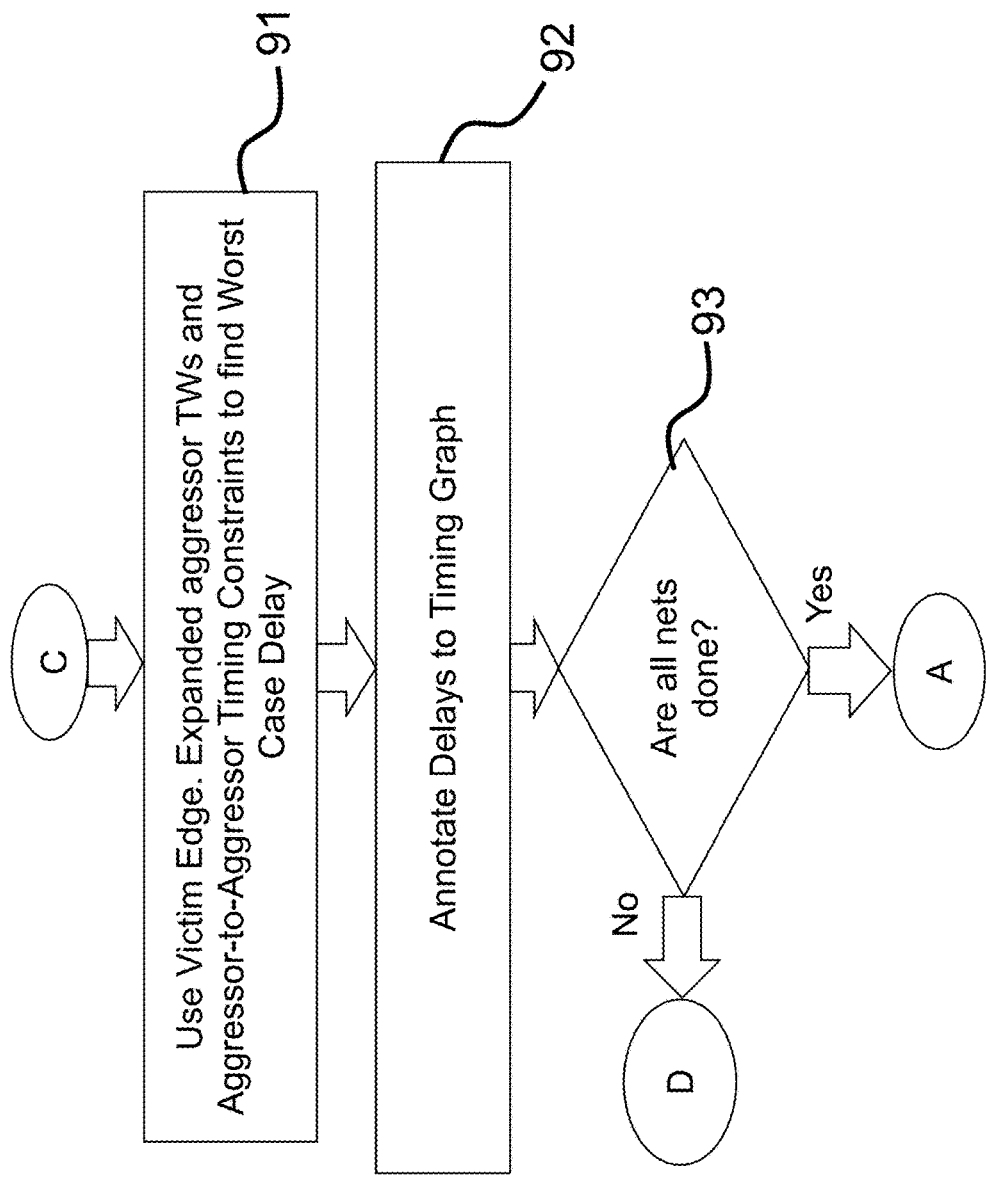

Turning to the explanatory diagram of FIG. 6, another sample circuit subsection 60 is schematically illustrated. In this sample circuit subsection, there are two paths 61, 63 going through the input net A of the NAND gate A1. The timing path 61 is shown in the example with a path CPPR of 1 ns, while timing path 63 is shown in the example with a path CPPR of 2 ns. The net A, as well as a number of other nets of the path 63 are victim nets subject to crosstalk coupling by a nearby aggressor net (not shown), as graphically indicated by their thicker line weight. Taking for example the victim net 62 driven by the buffer I3/Y, the full TW 64 of this net is graphically represented to be [12, 20]. The TW 66 of [14,19] for the attacking aggressor net is graphically indicated for reference with respect to the TW 64 of the victim net 62. If, in Path mode, the late (max) crosstalk delay analysis were to be carried out based on the full victim TW 64, the analysis would execute with respect to the late edge of that TW at time 20 ns. Since the late edge of the attacker TW 66 of [14, 19] lies at time 19 ns, the attacker would not impact the victim net at the late arrival time of 20 ns.

Note, however, that the victim TW 64 reflects a CPPR adjustment occurring in at least one timing path traversing the victim net 62, which adjustment would have had a broadening effect on that victim TW 64. Considering the path launched by flip flop F2 and captured by flip flop F3, the common point between the flip flops is at the buffer I2/Y whose output net 65 has a TW of [2,4]. This means that signal switching at the buffer I2/Y could occur at any point between time 2 ns and time 4 ns. Since the launching and capturing flip flops are thus both triggered by a common event, static timing analysis would reduce pessimism in slack (the difference between required and computed arrival times) by increasing the slack by a CPPR adjustment of 2 ns. For the 20 ns arrival edge at the victim net 62 (at the output node of the buffer I3/Y) normally used for crosstalk delay analysis in path mode, the output of the buffer I2/Y would have switched at 4 ns. If the switching edge occurs at 2 ns, the arrival at the victim net 62 would be at 18 ns. This 18 ns edge would be subject to crosstalk coupling from the aggressor since the aggressor TW 66 overlaps that 18 ns edge. Crosstalk delay analysis assuming the late 20 ns edge of the full victim TW 64 would miss this crosstalk effect, and the path mode is therefore optimistic.

Accurate crosstalk delay analysis requires suitable consideration of all possible arrival edges covering the uncertainty of arrival time at the common path point, which is represented by the path CPPR. In the illustrated case, the victim window portion 140 preferably executes to adaptively adjust the victim TW 64 to account for the largest (or worst case) CPPR adjustment of 2 ns in forming an optimized/effective victim TW of [18,20] for max (late/setup) analysis. Likewise, for early (hold) analysis, path mode would normally use the full victim TW 64 arrival/edge at time 12 ns and again lead to unduly optimistic results because the closest edge of the attacker TW 66 lies at time 14 ns. The victim window portion 140 preferably executes to adaptively adjust the victim TW 64 accordingly in forming an optimized/effective victim TW of [12, 14] for early analysis.

Table 1 shows for the sample case of FIG. 6 a comparison of victim timing windows conventionally employed, on the one hand, by the path and overlap modes of crosstalk delay analysis, and the effective timing windows employed, on the other hand, by those modes in accordance with the timing window optimization provided by the victim window portion 140. As shown in the Aggressor Impact column, optimism is thereby removed from conventional use of path mode for setup analysis in this particular example. Whereas conventional application of path mode with respect to the full victim timing window yields a determination of No Impact (due to crosstalk coupling by the aggressor net) for setup analysis, use of the optimized victim timing window yields a determination of Full Impact for the same setup analysis. Pessimism is also removed from conventional use of overlap mode for hold analysis in this particular example. Whereas conventional application of overlap mode with respect to the full victim timing window yields a determination of Full Impact for hold analysis, use of the optimized victim timing window yields a determination of No Impact for the same hold analysis.

TABLE 1

| Crosstalk Delay Analysis | Effective Victim Window | | Aggressor Window | | Aggressor Impact | |
|---|---|---|---|---|---|---|
| Mode | Hold | Setup | Hold | Setup | Hold | Setup |
| Overlap | [12-20] | [12-20] | [17-18] | | Full Impact | Full Impact |
| Path | [12] | [20] | | | No Impact | No Impact |
| TW Optimization | [12-14] | [18-20] | | | No Impact | Full Impact |

The victim window portion 140 thus operates in the disclosed embodiment of system 10 to optimize the victim TW for those victim nets/nodes found to be subject to certain timing properties. Where a victim net is found to be subject to a false path exception, subject to a multi-cycle path exception, or to be part of a clock path, however, its full TW is used for crosstalk delay analysis. Otherwise, a victim net's full TW is adaptively adjusted, according to the particular timing property in question for crosstalk delay analysis, as described herein. An example is when a victim net is found to be subject to a CPPR adjustment in any paths running therethrough.

As described in preceding paragraphs, the early and late edge portions of the victim TW in that case are adjusted accordingly to reflect the CPPR adjustment for crosstalk delay analysis. For Late crosstalk analysis (or Max delay calculation), the victim TW is adjusted to ensure that arrivals of all the valid Late paths going through the net are included. The arrival time range is reduced by an amount equal to the CPPR to form an effective timing window. Effective TWs of all the paths collectively define the victim TWs.

Likewise, for Early analysis (or Min delay calculation), the victim TW is adjusted to ensure that arrivals of all the valid Early paths going through the net are included. The arrival time range is increased by an amount equal to the CPPR.

In practice, the TWs formed would be bounded by the [E-L] window that gets used for a net when it acts as aggressor. Multiple victim TWs are created for different clocks.

The TW optimization unit 14 preferably also includes a window transformation portion 142 executable for each victim net to transform the victim TW by collapsing to a discrete victim edge and expanding its aggressor nets accordingly. This simplifies the computations and therefore eases the processing burden in carrying out certain crosstalk delay analyses. The TWs of crosstalk coupled victim and aggressor nets need to be aligned for the crosstalk delay impact of switching aggressors on victim transition. With the victim modeled in terms of a TW rather than a discrete edge value, computational challenges are posed for the delay maximization problem. Such computational challenges arise in a situation, for example, where multiple aggressors are coupled to a common victim, such that the aggressor timing windows lie in time on opposing sides of the victim window, or where the victim has multiple TWs of different width (spanning different E-L time intervals) from multiple clocks. The computational problem is preferably addressed by linearly transforming the system of TWs. More specifically, the victim TW is transposed to an edge, and the windows for the aggressors are transformed accordingly to maintain the constraints (such as closest distance) between the aggressor and victim TWs before the transform.

The window transformation portion 142 is preferably executed to define a width in time of a victim net's optimized timing window (as optimized by the victim window portion 140). The optimized timing window is then reduced, preferably, to one of its late or early edges, depending on the type of crosstalk delay analysis being executed. For example, the victim TW may be reduced down to its late edge for a late (max) analysis, and down to its early edge for an early (min) analysis. The timing window of each aggressor net corresponding to the given victim net is accordingly expanded by extending one of its late or early edges by the victim width according to the type of crosstalk analysis executed.

Referring to FIG. 7, there is shown a schematic diagram illustrating the window transformation carried out by the portion 142. FIGS. 7(*a*) and 7(*b*) graphically illustrate the widths and relative displacements in time between victim-aggressors TW's, before and after the linear window transformation. FIG. 7(*a*) illustrates the victim TW as optimized by victim window portion 140, alongside the TWs of its aggressor nets—two in this illustration, Aggressor 1 spaced a time distance D1 before the early edge of the victim TW and Aggressor 2 spaced a time distance D2 after the late edge of the victim TW. FIG. 7(*b*) illustrates transformation of the victim TW into a discrete victim edge (shown as narrow box), and the commensurate expansion of each aggressor timing window. The victim TW is reduced to the particular one of its edge being analyzed (in this case the late edge for max analysis), and each of the aggressor TWs is padded at its late edge by an extension 70, 70' having the same width as the optimized victim TW, namely VicWidth. Although the overall time spacing between the TWs of Aggressor 1 and Aggressor 2 is changed after the transformation, their separation distances from the victim TW, D1 and D2, remain unchanged.

The window transformation portion 142 preferably executes the following processes in one exemplary embodiment to carry out this TW transformation:
1. Obtain the Victim TW subject to optimization by the victim window portion 140.
    a. Account for multiple victim TWs where applicable, such as with different clocks, or upon replication of TWs if the aggressor/victim nets have TWs from different clock periods.
2. Determine the effective time width of each victim TW, VicWidth.
    a. Acquire the full original TWs for the victim net's aggressor nets.
    b. Shrink the victim TW to a victim edge, keeping the particular edge being analyzed Late (Early) for Max (Min) analysis.
    c. Expand the original TW of each aggressor TW by VicWidth. The expansion is corresponding done on the Late (Early) edge for Max (Min) analysis.

As illustrated in FIGS. 7(*a*)-7(*b*), Aggressor 1 and Aggressor 2 had a minimum separation of the time distance D1+D2+VicWidth prior to the TW transformation. Following TW transformation, the aggressors are separated by a lesser time distance equaling D1+D2. To avoid undue pessimism in crosstalk delay computation potentially caused by this apparent change in the separation time distance between the aggressor TWs, the TW optimization unit preferably includes a constraint generation portion 144. The constraint generation portion 144 executes to generate a compensatory constraint between the expanded aggressor TWs to enforce the pre-expansion separation time distance between them. Accordingly, the aggressor TWs are prevented from being erroneously perceived closer to one another in time despite the transformation.

More specifically, the constraints (distance) between the original un-expanded aggressors TWs are defined. Between each aggressor pair, timing constraints (say T12) between each aggressor pair are defined, for instance, setting the minimum distance between the closest edges of their TWs, before such aggressor TWs are expanded. Since T12=(D1+D2+VicWidth) in this example, two constraints are preferably determined for each aggressor pair, a left constraint and a right constraint. In a more complex design scenario, the aggressor may have multiple TWs from multiple clocks.

The constraint generation portion 144 preferably executes the following processes in one exemplary embodiment to define the compensatory timing constraints between a pair of aggressors:
    a. Create a set of test points—Iterating over sorted edges of the TWs of the aggressor pair and collecting the arrival time for the edges. Additional points are which lie mid-way between the edges of the aggressor TWs are established.
    b. Sort the test points—Preferably, a simple sorting step to suitably sort all the test points collected in the preceding process.
    c. Find left and right constraints.

Process c is used to find the minimum distance between the aggressor pair Ai and Aj, as follows:
    Left Constraint (ij)=Min Distance between Ai (Late) and Aj (Early)

Right Constraint (ij)=Min Distance between Ai (Early) and Aj (Late)
i. Iterate over each of the test points, to:
   a. Determine the closest edge of Ai and Aj corresponding to the test point.
   b. Compute the time distance between the closest edges.
   c. Update each of the Left and Right constraints accordingly if this newly computed time distance for either constraint is worse than the last computed time distance.
ii. At the end of this iterative loop, minimum constraints have been found.

Crosstalk delay analysis may proceed using the TWs resulting from the transformation, and the constraints generated responsive to the transformation. Reliable crosstalk delay analysis in the context of the given STA may be carried out, therefore, with the pessimism of GBA analysis substantially reduced by use of victim TWs resulting from valid timing paths, and without impacting the GBA-PBA boundedness. Preferably, the computational burden is minimized for certain aspects of the crosstalk delay analysis by modeling each victim TW as an Edge, and correspondingly expanding its aggressor TWs with commensurate modeling to honor the original timing constraints between aggressor TWs before this transformative modeling.

Referring now to FIGS. 8-1, 8-2, and 8-3, there is shown a flow diagram illustrating a flow of processes generally executed by the timing analysis system 10 in accordance with one exemplary embodiment and implementation of the present invention. At block 80, a predetermined STA on a given electronic circuit design is launched via a suitable user interface, whereupon a preliminary round of a predetermined SI analysis is executed at block 81 to compute delay at various nets/nodes of the design due to crosstalk or other such signal integrity effects. The delay computation is carried out with infinite TWs for given nodes, or with TWs unbounded E-L edges. The computed delays are annotated at block 82 to the timing graph suitably established for the circuit design. A check is made at block 83 to ensure this is done for all the nets of the circuit design's netlist. Thereafter, at block 83a, the timing graph is updated with a predetermined set of timing properties for various nets, based on suitable input models accessed by the system 10. As described in preceding paragraphs, these timing properties may include, for example, those relating to clock paths, false paths, and multi-cycle paths through various nets.

The flow proceeds to block 84 where a determination if a further, primary, round of the predetermined SI analysis is required. If so, the flow proceeds to block 84b, where the TWs of the nets are updated based upon the prior round of SI analysis, and a primary round of SI analysis is executed to compute delay at various nets/nodes of the design, with the finite updated TWs. At block 85, a victim net subject to crosstalk coupling by one or more aggressor/attacker nets is determined for delay analysis. The TW for this victim net is obtained at block 86 from suitable databases or other storage, along with various properties for this net, including for instance its slews, worst-case CPPR, and its timing properties. TW optimization is carried out by executing at block 87 the victim window portion 140 for the identified victim net to generate the optimized TW therefor. At block 88, the TW and slew are obtained from the suitable database for each aggressor net potentially impacting the victim net. Where the victim net is potentially impacted by multiple aggressor nets, the constraint generation portion 144 is executed at block 89 to generate the compensatory timing constraints for preserving the aggressor-to-aggressor TWs' time separation (to compensate for expansion of the aggressor TWs). At block 90, the window transformation portion 142 is executed to collapse each victim TW to an appropriate edge thereof, and expand each aggressor net TW accordingly. Where the victim is impacted by just one aggressor net, the process flows from block 88 directly to block 90, bypassing the constraint generation of block 89.

The flow proceeds thereafter to block 91, where the victim edge and expanded aggressor TW(s), and any generated timing constraints are used to determine worst case delay. The timing graph is annotated with the resulting delays at block 92. A check is then made at block 93 to ensure that all victim nets are identified and thus processed. If more nets remain to be checked, the flow returns to block 85 to identify another victim net. If all victim nets have been identified and processed, the flow returns to block 84 to determine if any further round of SI delay analysis is needed. If not, the flow proceeds from there to block 84a for final STA processing and reporting.

In an illustrative computer processor based implementation, the system may comprise a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) may also be developed to perform these functions.

Figure 9:
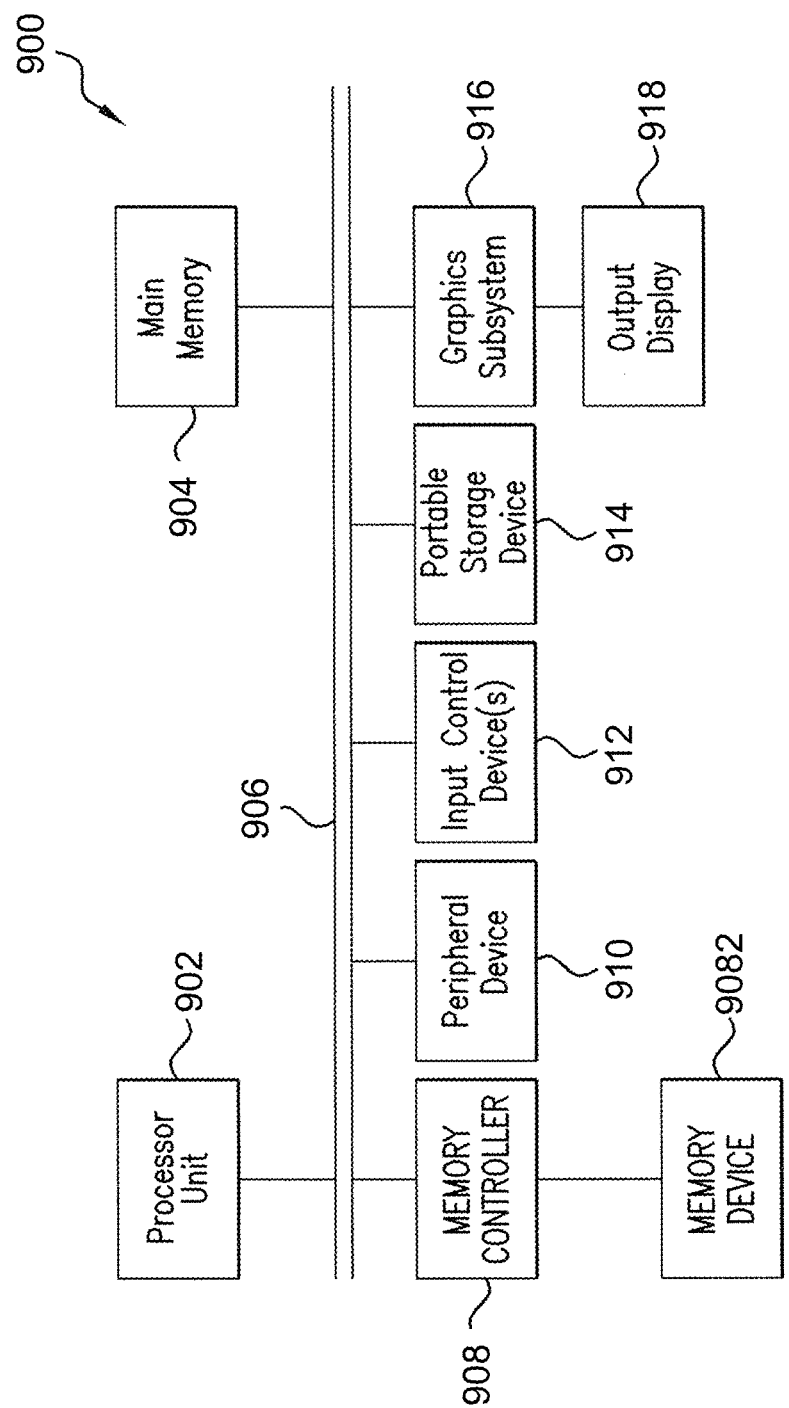
FIG. 9 is a block diagram illustrating an exemplary computer system for programmatic and/or hardware implementation of various aspects of the disclosed system and method.

As an example, FIG. 9 is a block diagram illustrating an exemplary computer system for programmatic and/or hardware implementation of various aspects of the disclosed system and method. For instance, it may serve as a host for such hardware modules, and/or as a host for executing software modules such as EDA tools/simulations/emulation/firmware, in accordance with various configurations of the disclosed system and method.

A computer system 900 includes: a processor unit 902, a main memory 904, an interconnect bus 906, a memory controller 908 that is coupled to a memory device 9082, peripheral device(s) 910, input control device(s) 912, portable storage medium drive(s) 914, a graphics subsystem 916, and an output display 918. Processor unit 902 may include a single microprocessor or a plurality of microprocessors for configuring computer system 900 as a multi-processor system. Main memory 904 stores, in part, instructions and data to be executed by processor unit 902. Main memory 904 preferably includes banks of dynamic random access memory (DRAM) as well as high-speed cache memory.

For simplicity and clarity, all the components of computer system 900 are shown connected via interconnect bus 906. However, various components of computer system 900 may be connected through one or more data transport means. For example, processor unit 902 and main memory 904 may be connected via a local microprocessor bus; and, memory controller 908, peripheral device(s) 910, portable storage medium drive(s) 914, and graphics subsystem 916 may be connected via one or more input/output (I/O) buses. Memory device 9082 may be implemented as a nonvolatile semiconductor memory for storing data and instructions to be used by processor unit 902. Memory device 9082 may store the software to load it to the main memory 904 or may be represented in an EDA tool simulation by suitable classes (incorporating data structures and functions operable upon the data structures) or the like as would be known to one of skill in the art.

Portable storage medium drive 914 operates to input and output data and code to and from the computer system 900. In one configuration, the software is stored on such a portable medium, and is input to computer system 900 via portable storage medium drive 914. Peripheral device(s) 910 may include any type of computer support device such as an input/output (I/O) interface, to add additional functionality to computer system 900. For example, peripheral device(s) 910 may include a network interface card, to interface computer system 900 to a network. Peripheral device(s) may also include a memory controller and nonvolatile memory.

Input control device(s) 912 provide a portion of the user interface for a computer system 900 user. Input control device(s) 912 may include an alphanumeric keypad for inputting alphanumeric and other key information; and a cursor control device such as a mouse, a trackpad or stylus; or cursor direction keys.

In order to display textual and graphical information, computer system 900 contains graphics subsystem 914 and output display(s) 918. Output display 918 may include a cathode ray tube (CRT) display, liquid crystal display (LCD), plasma, or active matrix organic light emitting diode (AMOLED) display. Graphics subsystem 716 receives textual and graphical information, and processes the information for output to display 918.

Example: Sample Results

Table 2 below summarizes results obtained from executing the timing analysis system 10 (denoted "New Mode" in the table) upon a set of sample circuit designs, in comparison to results obtained from execution of a conventionally configured STA system with path and overlap modes of crosstalk delay computation on the same set of sample circuit designs. The data collected is representative of 20 different circuit designs D-1 to D-20. The comparative results indicate that:

1. Overlap Mode GBA is the most pessimistic of all the three modes.
2. The new mode executed by system 10 yields notable reduction in GBA pessimism compared to Path Mode.

TABLE 2

| Design | TNS (setup) | | | Pessimism in TNS compared to Path Mode | |
|---|---|---|---|---|---|
| Name | Path | Overlap | New Mode | Overlap | New Mode |
| D-1 | −241853 | −241853 | −241853 | 0.00% | 0.00% |
| D-2 | −551 | −2999 | −1445 | 444.28% | 162.25% |
| D-3 | −2251222 | −2318340 | −2276385 | 2.98% | 1.12% |
| D-4 | −1145959 | −1362923 | −1228075 | 18.93% | 7.17% |
| D-5 | −4794317 | −6370320 | −6031498 | 32.87% | 25.81% |
| D-6 | −7569869 | −8771093 | −8304404 | 15.87% | 9.70% |
| D-7 | −1796570 | −1796611 | −1796572 | 0.00% | 0.00% |
| D-8 | −1728282 | −1737588 | −1732555 | 0.54% | 0.25% |
| D-9 | −2014949 | −2377678 | −2278398 | 18.00% | 13.07% |
| D-10 | −20110090 | −20618469 | −20496201 | 2.53% | 1.92% |
| D-11 | −609427 | −620136 | −614910 | 1.76% | 0.90% |
| D-12 | −21088 | −24030 | −21459 | 13.95% | 1.76% |
| D-13 | −5746 | −7481 | −6336 | 30.19% | 10.27% |
| D-14 | −1839773 | −2738033 | −2416016 | 48.82% | 31.32% |
| D-15 | −27636873 | −29583398 | −28735523 | 7.04% | 3.98% |
| D-16 | −28260710 | −30094101 | −29265273 | 6.49% | 3.55% |
| D-17 | −4465116 | −4700234 | −4632967 | 5.27% | 3.76% |
| D-18 | −4084478 | −4301886 | −4254309 | 5.32% | 4.16% |
| D-19 | −30463309 | −30511274 | −30504895 | 0.16% | 0.14% |

TABLE 2-continued

| Design | TNS (setup) | | | Pessimism in TNS compared to Path Mode | |
|---|---|---|---|---|---|
| Name | Path | Overlap | New Mode | Overlap | New Mode |
| D-20 | −5896905 | −6239961 | −6221407 | 5.82% | 5.50% |
| | Mean | | | 33.04% | 14.33% |
| | Standard Deviation | | | 97.36% | 35.67% |

Figure 10:
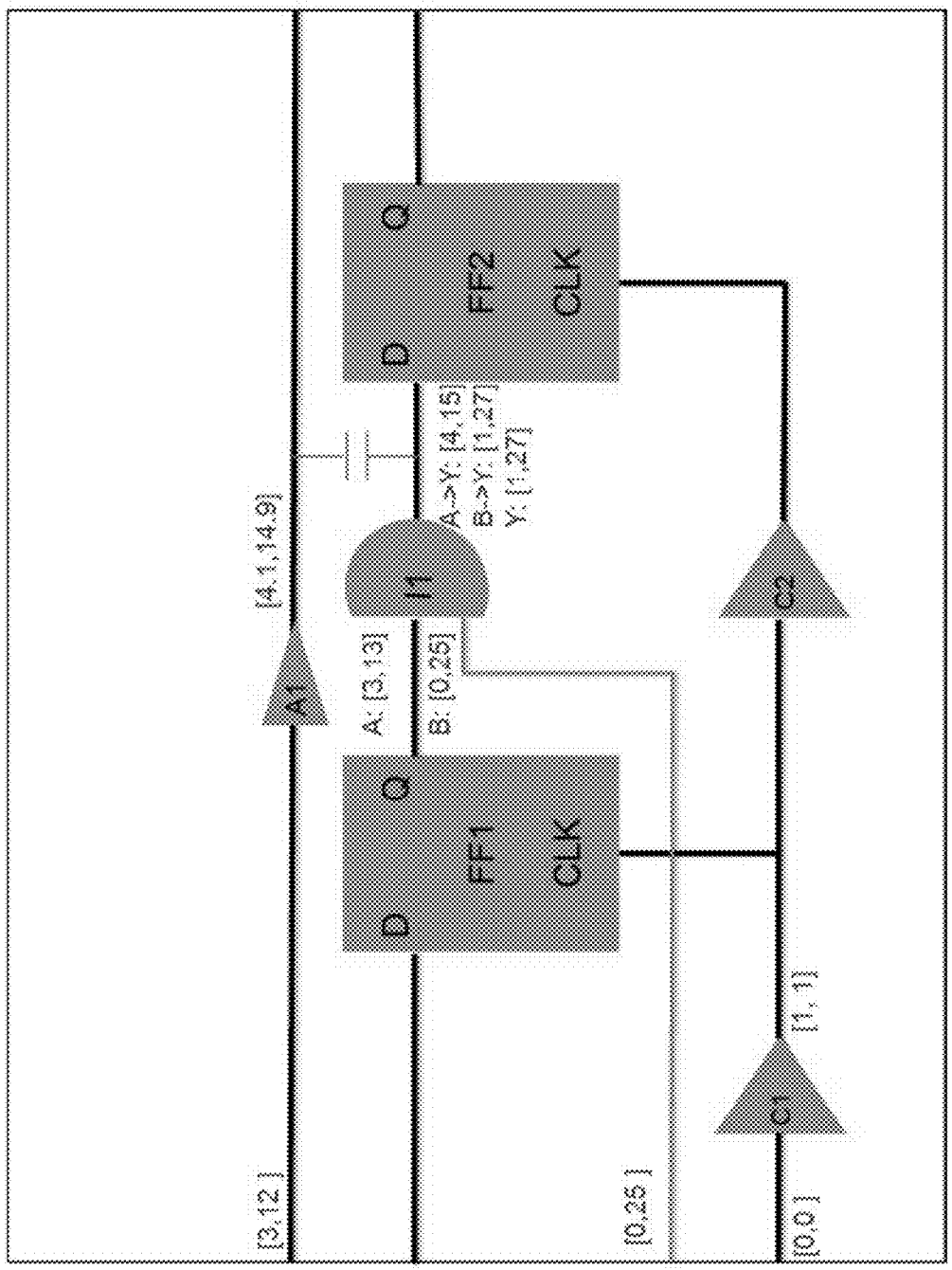
FIG. 10 is a graphically annotated schematic diagram illustrating sample test circuit which may be used to verify reliable processing when a victim node is subject to a first predetermined timing property.
Figure 11:
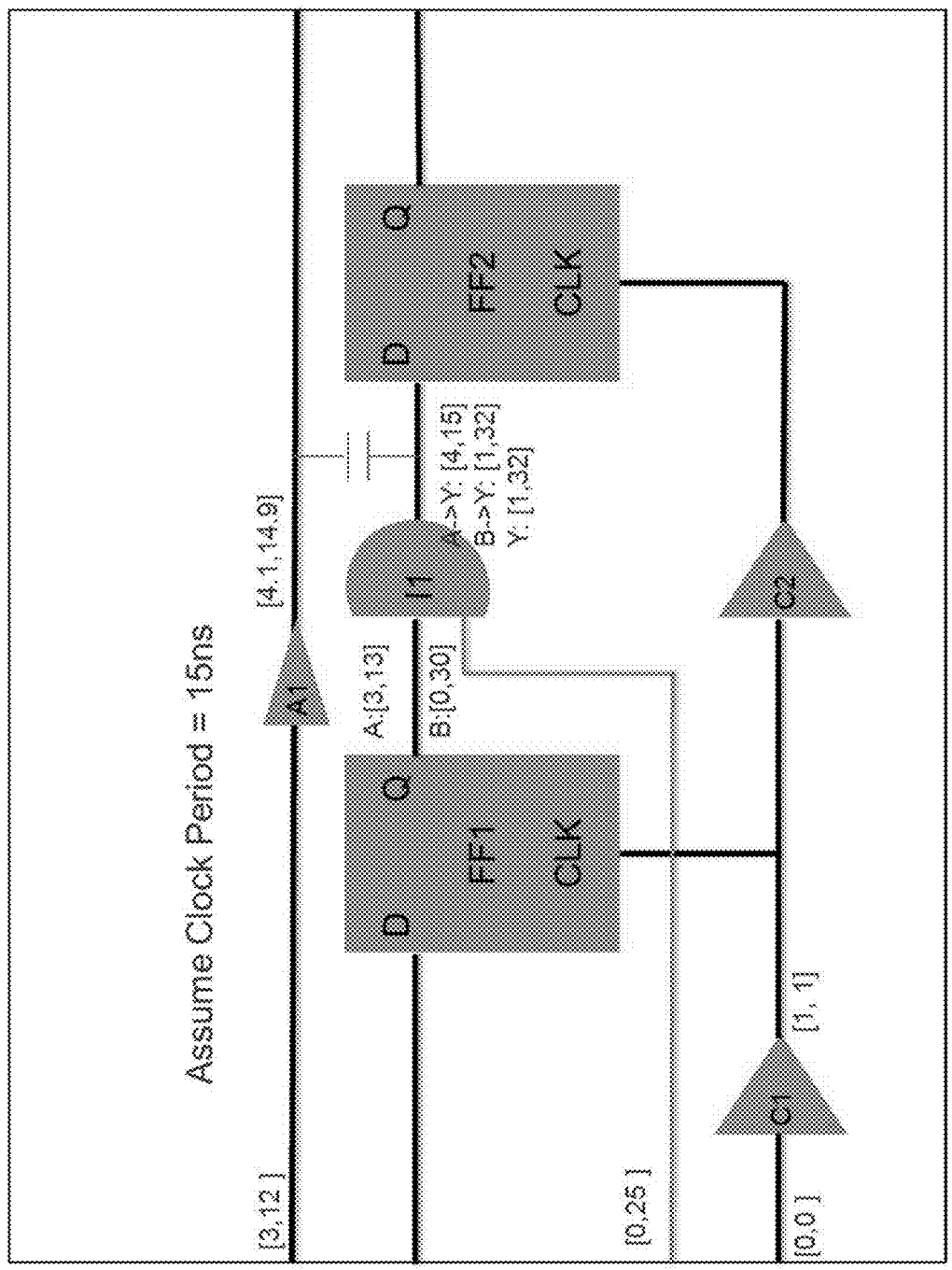
FIG. 11 is a graphically annotated schematic diagram illustrating sample test circuit which may be used to verify reliable processing when a victim node is subject to a second predetermined timing property; and, FIG. 12 is a graphically annotated schematic diagram illustrating sample test circuit which may be used to verify reliable processing when a victim node is subject to a third predetermined timing property.
Figure 12:
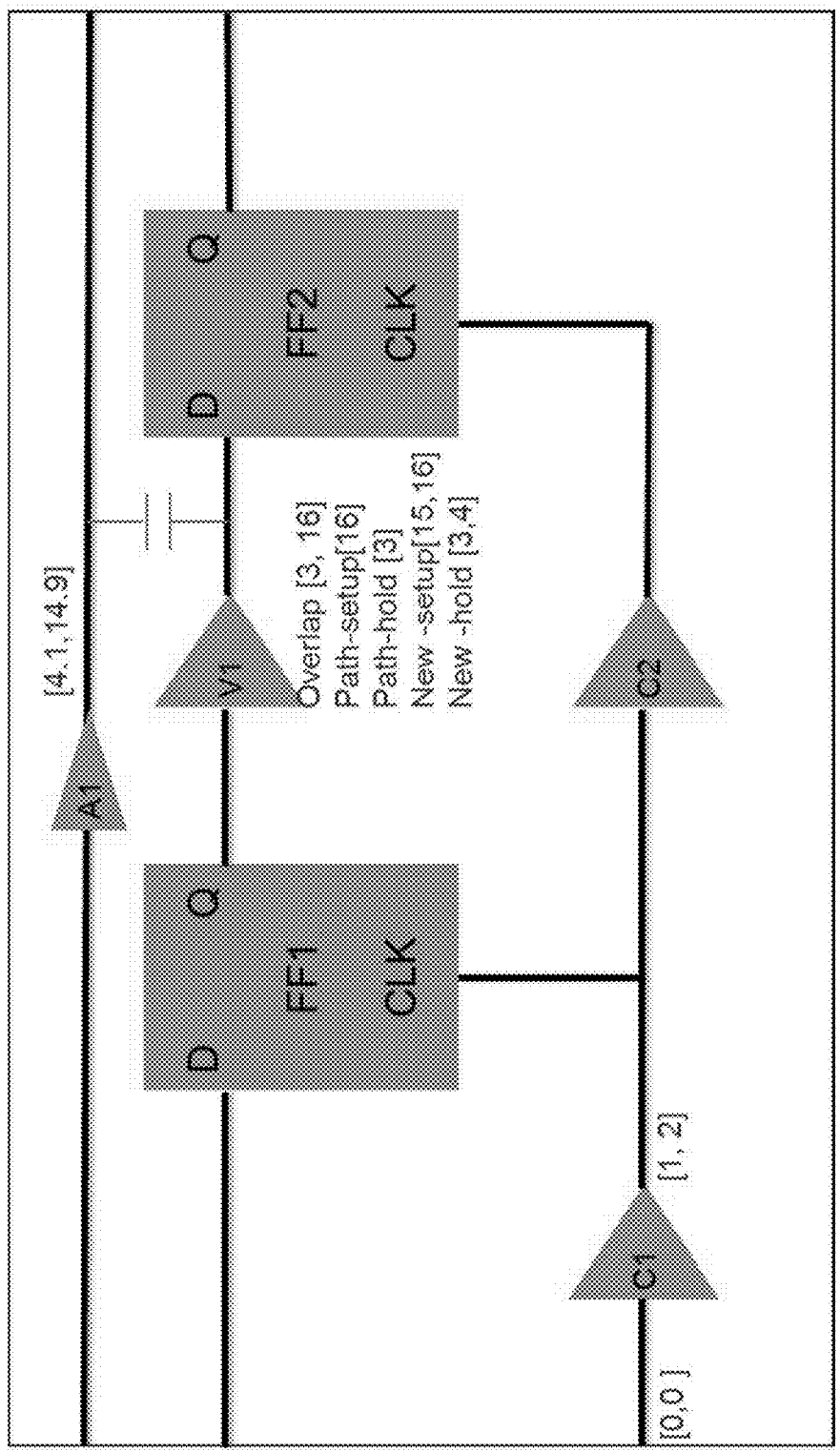

FIGS. 10-12 illustrate sample test circuit subsections on which the timing analysis system 10 may be executed to demonstrate certain aspects of its efficacy in reliably computing crosstalk delay analysis for STA. The TW's shown are pre-defined as needed using suitable constraints.

The sample test circuit of FIG. 10 may be used to verify reliable processing for false path handling during system execution of the new mode. In this test circuit, the TW of the victim node I1/Y at the output of the AND gate I1 is set at [1, 27]. Conventional STA with overlap mode of SI would report high crosstalk delta delay at this victim node. Conventional STA with path mode of SI would report zero crosstalk delta. The new mode yields a non-zero crosstalk delta bounded by the crosstalk delta obtained by the conventional overlap mode.

The sample test circuit of FIG. 11 may be used to verify reliable processing for multi-cycle path handling during system execution of the new mode. In this test circuit, the TW of the victim node I1/Y at the output of the AND gate I1 is set at [1, 32]. Again, conventional STA with overlap mode of SI would report high crosstalk delta delay at this victim node. Conventional STA with path mode of SI would report zero crosstalk delta. The new mode yields a non-zero crosstalk delta bounded by the crosstalk delta obtained by the conventional overlap mode.

The sample test circuit of FIG. 12 may be used to verify reliable processing for CPPR handling during system execution of the new mode. In this test circuit, the TWs used for the victim node at the output of the buffer V1 in each of the different modes (for setup or hold analysis) are shown. Once again, conventional STA with overlap mode of SI would report high crosstalk delta delay at this victim node. Conventional STA with path mode of SI would report zero crosstalk delta. The new mode yields a non-zero crosstalk delta bounded by the crosstalk delta obtained by the conventional overlap mode.

Although this invention has been described in connection with specific forms and embodiments thereof, it will be appreciated that various modifications other than those discussed above may be resorted to without departing from the spirit or scope of the invention as defined in the appended claims. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined in the appended claims.

What is claimed is:

1. A method for timing analysis of an electronic circuit design for an electronic circuit, the electronic circuit design having a plurality of cells interconnected at a plurality of nodes, the method comprising:
    establishing a timing graph defining a plurality of timing paths through different subsections of the electronic circuit design;

defining a timing window for each of the nodes included in at least one timing path, the timing window of each node having early and late edges respectively defining worst case early and late signal arrival times at the node;

executing at least one preliminary round of a predetermined signal integrity analysis on the electronic circuit design based on the timing windows of the nodes to identify at least one pair of the nodes as victim and aggressor nodes subject to crosstalk coupling;

adaptively adjusting the timing window of at least one said victim node within said subsections of the electronic circuit design according to a predetermined timing property acquired therefor to form an optimized timing window for said victim node;

executing at least one primary round of the predetermined signal integrity analysis on the electronic circuit design based in part on said optimized timing window for said victim node to generate a delay;

annotating the delay to the timing graph; and, executing a predetermined static timing analysis on all said subsections of the electronic circuit design based on the annotated timing graph to generate an optimized timing report, wherein the electronic circuit is adaptively updated responsive to the optimized timing report.

2. The method as recited in claim 1, further comprising executing window transformation, said window transformation including for each identified victim node:

defining a victim width traversed in time by said optimized timing window of said victim node;

reducing said optimized timing window of said victim node to a victim edge having a discrete time value selected from said optimized timing window; and, expanding a timing window of each said aggressor node corresponding to said victim node by the victim width.

3. The method as recited in claim 2, further comprising generating a compensatory constraint for each pair of related aggressor nodes crosstalk coupled to a common victim node, said related aggressor nodes having respective timing windows disposed about said optimized timing window of the common victim node to be separated in time by a pre-expansion time distance, said compensatory constraint being applicable to the expanded timing windows of said related aggressor nodes to enforce the pre-expansion time distance separation therebetween.

4. The method as recited in claim 3, wherein the pre-expansion time distance separation includes the victim width of the common victim node, a first time distance of the common victim node from one of said related aggressor nodes, and a second distance thereof from the other of said related aggressor nodes.

5. The method as recited in claim 1, wherein the predetermined timing property acquired for each said victim node includes at least one of:

a false path exception applicable to a timing path defined through said victim node;

a multi-cycle path exception applicable to a timing path defined through said victim node;

a clock path defined through said victim node; and, a common path pessimism reduction (CPPR) applicable to a timing path defined through said victim node.

6. The method as recited in claim 5, wherein:

for each said victim node having the false path exception occurring on at least one timing path defined therethrough, the timing window is preserved;

for each said victim node having the multi-cycle path exception occurring on at least one timing path defined therethrough, the timing window is preserved;

for each said victim node having a clock path defined therethrough, the timing window is preserved; and, for each said victim node having a CPPR adjustment occurring on at least one timing path defined therethrough, the timing window is effectively defined with at least one of the early or late edges thereof ranging in uncertainty to include the worst case CPPR adjustment.

7. The method as recited in claim 2, wherein the predetermined signal integrity analysis is selectively configured to execute one of a late crosstalk analysis or an early crosstalk analysis, the late crosstalk analysis determining maximum signal arrival time delays at said victim nodes of the electronic circuit design, the early crosstalk analysis determining minimum signal arrival time delays at said victim nodes of the electronic circuit design.

8. The method as recited in claim 7, wherein:

the late crosstalk analysis includes said optimized timing window of each said victim node being reduced to the late edge thereof, and the timing window of each said aggressor net corresponding to said victim node being responsively expanded by adding the victim width to the late edge thereof; and, the early crosstalk analysis including said optimized timing window of each said victim node being reduced to the early edge thereof, and the timing window of each said aggressor node corresponding to said victim node being responsively expanded by adding the victim width to the early edge thereof.

9. The method as recited in claim 3, wherein the predetermined static timing analysis is configured to execute a graph based analysis (GBA), and the predetermined signal integrity analysis includes crosstalk delay computation.

10. A system for timing analysis of an electronic circuit design for an electronic circuit, the electronic circuit design having a plurality of cells interconnected by a plurality of nets, the system comprising:

a computer readable data storage portion storing a plurality of input models, the input models including a netlist defining the electronic circuit design and a plurality of timing constraints respectively;

a timing analysis engine being configured to execute a predetermined static timing analysis based upon the input models acquired from the data storage portion, the timing analysis engine establishing a timing graph defining a plurality of timing paths through different subsections of the electronic circuit design, said timing analysis engine executing at least one preliminary round of a predetermined signal integrity analysis to define a timing window for each of the nodes included in at least one timing path, the timing window of each net having an early and late edges respectively defining worst case early and late signal arrival times at the net, said timing analysis engine determining based on the timing windows at least one pair of the nets as victim and aggressor nets subject to crosstalk coupling; and, a timing window optimization unit coupled to said timing analysis engine, said timing window optimization unit including a victim window portion executing to adaptively adjust the timing window of at least one said victim net within said subsections of the electronic circuit design according to a predetermined timing property acquired therefor to form an optimized timing window for said victim net;

wherein said timing analysis engine executes at least one primary round of the predetermined signal integrity analysis on the electronic circuit design based in part on said optimized timing window for each said victim node to generate a delay, and executes the predetermined static timing analysis on all said subsections of the electronic circuit design based on the timing graph with the delay annotated thereto to generate an optimized timing report, and, wherein the electronic circuit is adaptively updated responsive to the optimized timing report.

11. The system as recited in claim 10, wherein said victim window portion carries out adaptive adjustment of the timing windows to:

preserve the timing window for each said victim node having a false path exception occurring on at least one timing path defined therethrough;

preserve the timing window for each said victim node having a multi-cycle path exception occurring on at least one timing path defined therethrough;

preserve the timing window as the optimized timing window for each said victim node having a clock path defined therethrough; and, define a range of uncertainty for a selected one of the early or late edges of the timing window for each said victim node having a CPPR adjustment occurring on a timing path defined therethrough, the range of uncertainty extending from the selected early or late edge by the worst case CPPR adjustment.

12. The system as recited in claim 10, wherein the predetermined signal integrity analysis is selectively configured to execute one of a late crosstalk analysis or an early crosstalk analysis, the late crosstalk analysis determining maximum signal arrival time delays at said victim nets of the electronic circuit design, the early crosstalk analysis determining minimum signal arrival time delays at said victim nets of the electronic circuit design.

13. The system as recited in claim 12, wherein the timing optimization unit further includes a window transformation portion executable for each said victim net to:

define a victim width traversed in time by said optimized timing window of said victim net;

reduce said optimized timing window of said victim net to one of the late or early edges thereof according to the type of crosstalk analysis executed; and, expand a timing window of each said aggressor net corresponding to said victim net by extending one of the late or early edges thereof by the victim width according to the type of crosstalk analysis executed.

14. The system as recited in claim 13, wherein:

said timing optimization unit further includes a constraint generation portion executable to generate a compensatory constraint for each pair of related aggressor nets crosstalk coupled to a common victim net, said related aggressor nets having respective timing windows disposed about said optimized timing window of the common victim net to be separated in time by a pre-expansion time distance;

the compensatory constraint is applicable to the expanded timing windows of said related aggressor nets to enforce the pre-expansion time distance separation therebetween during execution of the predetermined static timing analysis; and, the pre-expansion time distance separation includes the victim width of the common victim net, a first time distance of the common victim net from one of said related aggressor nets, and a second distance thereof from the other of said related aggressor nets.

15. The system as recited in claim 14, wherein the predetermined static timing analysis is configured to execute a graph based analysis (GBA), and the predetermined signal integrity analysis includes crosstalk delay computation.

16. A method for timing analysis of an electronic circuit design for an electronic circuit, the electronic circuit design having a plurality of cells interconnected at a plurality of nodes, the method comprising:

establishing a timing graph defining a plurality of timing paths through different subsections of the electronic circuit design;

defining a timing window for each of the nodes included in at least one timing path, the timing window of each node having early and late edges respectively defining worst case early and late signal arrival times at the node;

executing at least one preliminary round of a predetermined signal integrity analysis on the electronic circuit design based on the timing windows of the nodes to identify at least one pair of the nodes as victim and aggressor nodes subject to crosstalk coupling;

adaptively adjusting the timing window of each said victim node according to a predetermined timing property acquired therefor to form an optimized timing window for said victim node, the adaptive adjustment of the timing windows including:

for each said victim node having a false path occurring on at least one timing path defined therethrough, preserving the timing window as the optimized timing window;

for each said victim node having a multi-cycle path occurring on at least one timing path defined therethrough, preserving the timing window as the optimized timing window;

for each said victim node having a clock path defined therethrough, preserving the timing window as the optimized timing window; and, for each said victim node having a CPPR adjustment occurring on at least one timing path defined therethrough, effectively defining at least one of the early or late edges of the timing window with a range of uncertainty expanded by the worst case CPPR adjustment;

executing at least one primary round of the predetermined signal integrity analysis on the electronic circuit design based in part on said optimized timing window for each said victim node to generate a delay;

annotating the delay to the timing graph; and, executing a predetermined static timing analysis based on the annotated timing graph to generate an optimized timing report, wherein the electronic circuit is adaptively updated responsive to the optimized timing report.

17. The method as recited in claim 16, wherein the predetermined signal integrity analysis is selectively configured to execute one of a late crosstalk analysis or an early crosstalk analysis, the late crosstalk analysis determining maximum signal arrival time delays at said victim nodes of the electronic circuit design, the early crosstalk analysis determining minimum signal arrival time delays at said victim nodes of the electronic circuit design.

18. The method as recited in claim 17, further comprising executing window transformation, said window transformation including for each said victim node:

defining a victim width traversed in time by said optimized timing window of said victim node;

reducing said optimized timing window of said victim node to one of the late or early edges thereof according to the type of crosstalk analysis executed; and, expanding a timing window of each said aggressor node corresponding to said victim node by extending one of the late or early edges thereof said by the victim width according to the type of crosstalk analysis executed.

19. The method as recited in claim 18, further comprising generating a compensatory constraint for each pair of related aggressor nodes crosstalk coupled to a common victim node, said related aggressor nodes having respective timing windows disposed about said optimized timing window of the common victim node to be separated in time by a pre-expansion time distance, wherein:

said compensatory constraint is applicable to the expanded timing windows of said related aggressor nodes to enforce the pre-expansion time distance separation therebetween; and, the pre-expansion time distance separation includes the victim width of the common victim node, a first time distance of the common victim node from one of said related aggressor nodes, and a second distance thereof from the other of said related aggressor nodes.

20. The method as recited in claim 19, wherein the predetermined static timing analysis is configured to execute a graph based analysis (GBA), and the predetermined signal integrity analysis includes crosstalk delay computation.

* * * * *